US011483870B2

(12) United States Patent
Lei et al.

(10) Patent No.: US 11,483,870 B2
(45) Date of Patent: Oct. 25, 2022

(54) RESOURCE MAPPING AND WAVEFORM GENERATION FOR UPLINK TRANSMISSION

(71) Applicant: QUALCOMM Incorporated, San Diego, CA (US)

(72) Inventors: Jing Lei, San Diego, CA (US); Seyong Park, San Diego, CA (US); Wei Yang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 16/785,360

(22) Filed: Feb. 7, 2020

(65) Prior Publication Data

US 2020/0314911 A1    Oct. 1, 2020

Related U.S. Application Data

(60) Provisional application No. 62/825,706, filed on Mar. 28, 2019.

(51) Int. Cl.
*H04W 74/08* (2009.01)
*H04W 72/04* (2009.01)
*H04W 56/00* (2009.01)

(52) U.S. Cl.
CPC ....... *H04W 74/0833* (2013.01); *H04W 56/00* (2013.01); *H04W 72/04* (2013.01); *H04W 74/0883* (2013.01); *H04W 74/0891* (2013.01)

(58) Field of Classification Search
CPC . H04W 74/0833; H04W 72/04; H04W 56/00; H04W 74/0883; H04W 74/04;
(Continued)

(56) References Cited

U.S. PATENT DOCUMENTS 9,125,187 B2    9/2015    Uemura et al.
10,250,362 B2   4/2019    Marinier et al.
(Continued)

FOREIGN PATENT DOCUMENTS

WO    WO-2010082735 A2    7/2010

OTHER PUBLICATIONS

Partial International Search Report—PCT/US2020/017442—ISAEPO—dated May 11, 2020.
(Continued)

*Primary Examiner* — Nishant Divecha
(74) *Attorney, Agent, or Firm* — Holland & Hart LLP

(57) ABSTRACT

Methods, systems, and devices for wireless communications are described. The described techniques provide for a user equipment (UE) to adjust a random access message that is transmitted to a base station in an asynchronous uplink transmission. The UE may use a constrained mapping of time and frequency resources for the random access message or transmit all portions of the message in a continuous transmission. The UE may also adjust the timing of the portions of the message. The base station may use a portion of the message, such as a preamble, to perform channel estimation for another portion of the message, such as a payload, to improve decoding of the transmitted message. Additionally, the UE may configure a waveform of the message to improve the continuous transmission of the message, for example by reducing interference between portions of the message.

24 Claims, 21 Drawing Sheets

(58) Field of Classification Search
CPC ........... H04W 72/042; H04W 72/0453; H04W 72/1268; H04W 74/004; H04W 74/0891; H04L 47/00; H04L 5/0057; H04L 2012/5631; H04L 5/0035
See application file for complete search history.

(56) References Cited

U.S. PATENT DOCUMENTS

| | | | | |
|---|---|---|---|---|
| 2008/0194259 | A1* | 8/2008 | Vujcic | H04W 74/004 455/435.1 |
| 2009/0201865 | A1* | 8/2009 | Uemura | H04L 5/0053 370/329 |
| 2011/0090856 | A1* | 4/2011 | Cho | H04L 27/2602 370/329 |
| 2011/0194432 | A1* | 8/2011 | Kato | H04W 74/002 370/252 |
| 2015/0289292 | A1 | 10/2015 | Sun et al. | |
| 2018/0324854 | A1* | 11/2018 | Phuyal | H04W 74/085 |
| 2020/0029366 | A1 | 1/2020 | Xiong et al. | |
| 2020/0296602 | A1* | 9/2020 | Tsai | H04W 74/0833 |
| 2021/0144777 | A1* | 5/2021 | Tang | H04W 74/004 |
| 2021/0176781 | A1* | 6/2021 | Wang | H04W 80/02 |
| 2021/0351865 | A1* | 11/2021 | Ouchi | H04W 24/08 |

OTHER PUBLICATIONS

International Search Report and Written Opinion—PCT/US2020/017442—ISAEPO—dated Jul. 8, 2020.
Qualcomm Incorporated: "Channel Structure for Two-Step RACH", 3GPP Draft, 3GPP TSG-RAN WG1 Meeting #96, R1-1902977, Channel Structure for Two-Step RACH, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16. 2019), XP051600674, pp. 1-10, Retrieved from the Internet: URL: http://www.3gpp.org/ftp/tsg%5Fran/WG1%5FRL1/TSGR1%5F96/Docs/R1%2D1902977%2Ezip, [retrieved on Feb. 16, 2019], section 2.1-section 2.3.

* cited by examiner

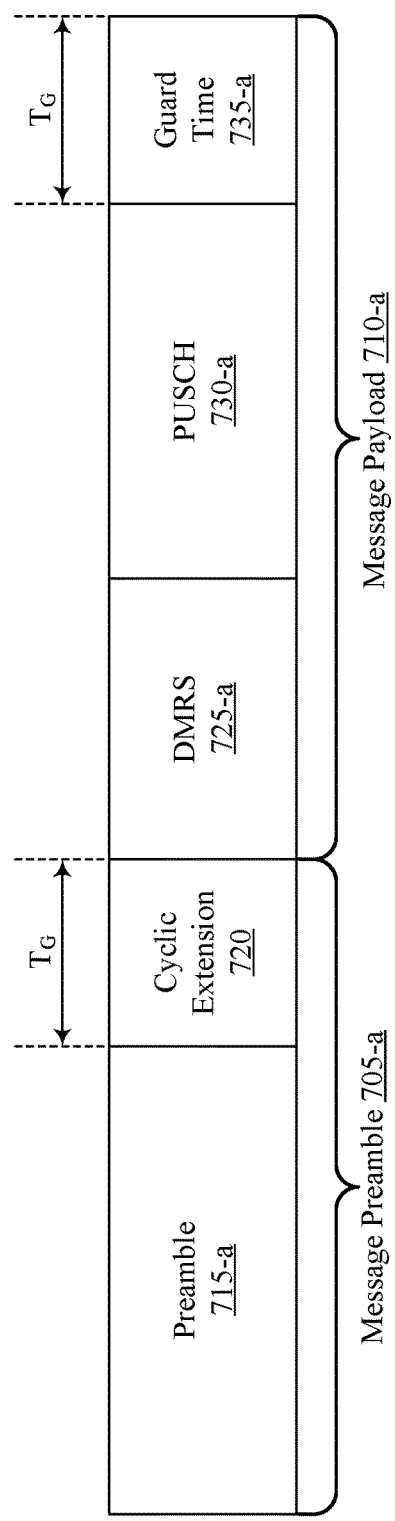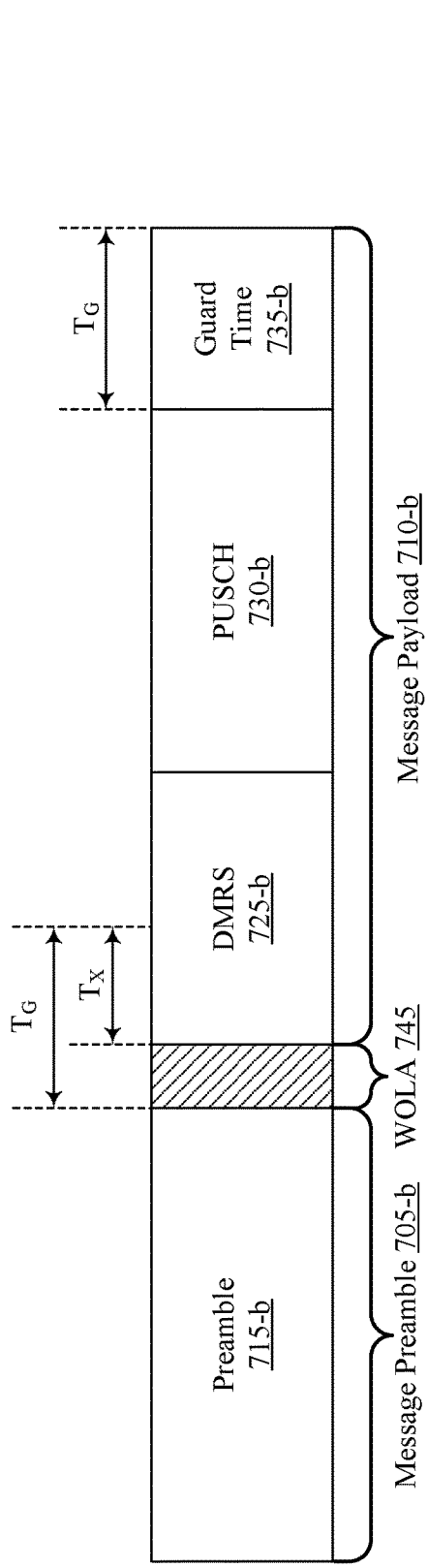
Figure 7A
Figure 7B

RESOURCE MAPPING AND WAVEFORM GENERATION FOR UPLINK TRANSMISSION

CROSS REFERENCE

The present application for patent claims the benefit of U.S. Provisional Patent Application No. 62/825,706 by LEI et al., entitled "RESOURCE MAPPING AND WAVEFORM GENERATION FOR UPLINK TRANSMISSION," filed Mar. 28, 2019, assigned to the assignee hereof, and which is expressly incorporated by reference herein.

BACKGROUND

The following relates generally to wireless communications, and more specifically to resource mapping and waveform generation for uplink transmission.

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may transmit a random access message to a base station in an asynchronous uplink transmission. The uplink transmission may be asynchronous due to insufficient timing information, for example. A large timing offset may lead to degraded channel estimation of portions of the message, the base station failing to detect the message, interference between portions of the message, or interference with signals associated with other UEs.

SUMMARY

The described techniques relate to improved methods, systems, devices, and apparatuses that support resource mapping and waveform generation for uplink transmission. Generally, the described techniques provide for a user equipment (UE) to adjust a random access message that is transmitted to a base station in an asynchronous uplink transmission. The UE may use a constrained mapping of time and frequency resources for the random access message or transmit all portions of the message in a continuous transmission to reduce the impact of the asynchronous uplink transmission. The UE may also adjust the timing of the portions of the message to improve transmission of the message. The base station may use a portion of the message, such as a preamble, to perform channel estimation for another portion of the message, such as a payload, to improve decoding of the transmitted message. Additionally, the UE may configure a waveform of the message to improve the continuous transmission of the message, for example by reducing interference between portions of the message.

A method of wireless communications at a user equipment is described. The method may include determining that a random access channel uplink transmission is asynchronous, the random access channel uplink transmission including a preamble and a payload, determining a mapping for resources of the preamble and resources of the payload based on determining that the random access channel uplink transmission is asynchronous, determining a first radio frequency resource for transmitting the preamble and a second radio frequency resource for transmitting the payload based on the mapping, and transmitting the preamble over the first radio frequency resource and the payload over the second radio frequency resource.

An apparatus for wireless communications at a user equipment is described. The apparatus may include a processor, memory in electronic communication with the processor, and instructions stored in the memory. The instructions may be executable by the processor to cause the apparatus to determine that a random access channel uplink transmission is asynchronous, the random access channel uplink transmission including a preamble and a payload, determine a mapping for resources of the preamble and resources of the payload based on determining that the random access channel uplink transmission is asynchronous, determine a first radio frequency resource for transmitting the preamble and a second radio frequency resource for transmitting the payload based on the mapping, and transmit the preamble over the first radio frequency resource and the payload over the second radio frequency resource.

Another apparatus for wireless communications at a user equipment is described. The apparatus may include means for determining that a random access channel uplink transmission is asynchronous, the random access channel uplink transmission including a preamble and a payload, determining a mapping for resources of the preamble and resources of the payload based on determining that the random access channel uplink transmission is asynchronous, determining a first radio frequency resource for transmitting the preamble and a second radio frequency resource for transmitting the payload based on the mapping, and transmitting the preamble over the first radio frequency resource and the payload over the second radio frequency resource.

A non-transitory computer-readable medium storing code for wireless communications at a user equipment is described. The code may include instructions executable by a processor to determine that a random access channel uplink transmission is asynchronous, the random access channel uplink transmission including a preamble and a payload, determine a mapping for resources of the preamble and resources of the payload based on determining that the random access channel uplink transmission is asynchronous, determine a first radio frequency resource for transmitting the preamble and a second radio frequency resource for transmitting the payload based on the mapping, and transmit the preamble over the first radio frequency resource and the payload over the second radio frequency resource.

Some examples of the method, apparatuses, and non-transitory computer-readable medium described herein may further include operations, features, means, or instructions for receiving, from a base station, system information indicating a time-frequency resource mapping or a waveform generation or both of the random access uplink transmission, where determining the mapping may be based on receiving the system information.

Some examples of the method, apparatuses, and non-transitory computer-readable medium described herein may further include operations, features, means, or instructions for determining that a second random access channel uplink transmission may be synchronous, the second random access channel uplink transmission including a second preamble and a second payload, and transmitting the second preamble over a third radio frequency resource and the second payload over a fourth radio frequency resource that at least partially overlaps with the first radio frequency resource and the third radio frequency resource.

In some examples of the method, apparatuses, and non-transitory computer-readable medium described herein, the second radio frequency resource may be the same as the first radio frequency resource.

In some examples of the method, apparatuses, and non-transitory computer-readable medium described herein, the second radio frequency resource occupies a portion of the first radio frequency resource.

In some examples of the method, apparatuses, and non-transitory computer-readable medium described herein, the second payload may be associated with the preamble and the second preamble.

Some examples of the method, apparatuses, and non-transitory computer-readable medium described herein may further include operations, features, means, or instructions for determining that the user equipment stores uplink timing information associated with the second random access channel uplink transmission, where determining that the second random access channel uplink transmission may be synchronous may be based on determining that the user equipment stores the uplink timing information associated with the second random access channel uplink transmission.

Some examples of the method, apparatuses, and non-transitory computer-readable medium described herein may further include operations, features, means, or instructions for determining that a timer is running at the user equipment, the timer associated with the second random access channel uplink transmission, where determining that the second random access channel uplink transmission is synchronous may be based on determining that the timer is running at the user equipment.

In some examples of the method, apparatuses, and non-transitory computer-readable medium described herein, the second radio frequency resource may be the same as the first radio frequency resource.

In some examples of the method, apparatuses, and non-transitory computer-readable medium described herein, the second radio frequency resource partially overlaps with the first radio frequency resource.

In some examples of the method, apparatuses, and non-transitory computer-readable medium described herein, the second radio frequency resource occupies a portion of the first radio frequency resource.

Some examples of the method, apparatuses, and non-transitory computer-readable medium described herein may further include operations, features, means, or instructions for determining that the user equipment may be in a radio resource control idle state or a radio resource control inactive state, where determining that the random access channel uplink transmission may be asynchronous may be based on determining that the user equipment may be in the radio resource control idle state or the radio resource control inactive state.

Some examples of the method, apparatuses, and non-transitory computer-readable medium described herein may further include operations, features, means, or instructions for determining that uplink timing information associated with the random access channel uplink transmission and stored by the user equipment may be insufficient, where determining that the random access channel uplink transmission may be asynchronous may be based on determining that the uplink timing information may be insufficient.

Some examples of the method, apparatuses, and non-transitory computer-readable medium described herein may further include operations, features, means, or instructions for determining that a time alignment timer associated with the random access channel uplink transmission has expired, where determining that the random access channel uplink transmission may be asynchronous may be based on determining that the time alignment timer has expired.

Some examples of the method, apparatuses, and non-transitory computer-readable medium described herein may further include operations, features, means, or instructions for determining that the user equipment does not store uplink timing information associated with the random access channel uplink transmission, where determining that the random access channel uplink transmission may be asynchronous may be based on determining that the user equipment does not store the uplink timing information associated with the random access channel uplink transmission.

In some examples of the method, apparatuses, and non-transitory computer-readable medium described herein, the preamble may be configured to be used by a base station for channel estimation associated with the payload.

In some examples of the method, apparatuses, and non-transitory computer-readable medium described herein, the random access channel uplink transmission includes a two-step random access channel uplink transmission.

In some examples of the method, apparatuses, and non-transitory computer-readable medium described herein, the payload of the random access channel uplink transmission includes one or more of a demodulation reference signal, a physical uplink shared channel, or a guard time.

In some examples of the method, apparatuses, and non-transitory computer-readable medium described herein, the mapping associated with asynchronous uplink transmissions may be different than a mapping associated with synchronous uplink transmissions.

A method of wireless communications at a user equipment is described. The method may include determining that a random access channel uplink transmission is asynchronous, the random access channel uplink transmission including a preamble and a payload, determining a signal to transmit during a guard time associated with the preamble based on determining that the random access channel uplink transmission is asynchronous, and transmitting the preamble, the signal during the guard time associated with the preamble, and the payload as a continuous transmission.

An apparatus for wireless communications at a user equipment is described. The apparatus may include a processor, memory in electronic communication with the processor, and instructions stored in the memory. The instructions may be executable by the processor to cause the apparatus to determine that a random access channel uplink transmission is asynchronous, the random access channel uplink transmission including a preamble and a payload, determine a signal to transmit during a guard time associated with the preamble based on determining that the random access channel uplink transmission is asynchronous, and transmit the preamble, the signal during the guard time associated with the preamble, and the payload as a continuous transmission.

Another apparatus for wireless communications at a user equipment is described. The apparatus may include means for determining that a random access channel uplink transmission is asynchronous, the random access channel uplink transmission including a preamble and a payload, determining a signal to transmit during a guard time associated with the preamble based on determining that the random access channel uplink transmission is asynchronous, and transmitting the preamble, the signal during the guard time associated with the preamble, and the payload as a continuous transmission.

A non-transitory computer-readable medium storing code for wireless communications at a user equipment is described. The code may include instructions executable by a processor to determine that a random access channel uplink transmission is asynchronous, the random access channel uplink transmission including a preamble and a payload, determine a signal to transmit during a guard time associated with the preamble based on determining that the random access channel uplink transmission is asynchronous, and transmit the preamble, the signal during the guard time associated with the preamble, and the payload as a continuous transmission.

Some examples of the method, apparatuses, and non-transitory computer-readable medium described herein may further include operations, features, means, or instructions for receiving, from a base station, system information indicating a time-frequency resource mapping or a waveform generation or both of the random access uplink transmission, where determining the signal may be based on receiving the system information.

Some examples of the method, apparatuses, and non-transitory computer-readable medium described herein may further include operations, features, means, or instructions for determining a waveform configuration of the random access channel uplink transmission based on determining that the random access channel uplink transmission may be asynchronous, where determining the signal may be based on determining the waveform configuration of the random access channel uplink transmission.

In some examples of the method, apparatuses, and non-transitory computer-readable medium described herein, the waveform configuration may be a static configuration stored by the user equipment.

In some examples of the method, apparatuses, and non-transitory computer-readable medium described herein, determining the signal may include operations, features, means, or instructions for extending, cyclically, a waveform of the preamble for at least a portion of a duration of the guard time associated with the preamble. In some examples of the method, apparatuses, and non-transitory computer-readable medium described herein, the extended waveform of the preamble includes a cyclic postfix of the preamble.

In some examples of the method, apparatuses, and non-transitory computer-readable medium described herein, determining the signal may include operations, features, means, or instructions for extending, cyclically, a waveform of the payload for at least a portion of a duration of the guard time associated with the preamble. In some examples of the method, apparatuses, and non-transitory computer-readable medium described herein, the extended waveform of the payload includes a cyclic prefix of the payload.

Some examples of the method, apparatuses, and non-transitory computer-readable medium described herein may further include operations, features, means, or instructions for determining a semi-static timing advance adjustment for the payload, and advancing a transmission time of the payload by a value of the timing advance adjustment, where transmitting the preamble, the signal, and the payload may be based on applying the semi-static timing advance adjustment to the transmission time of the payload.

In some examples of the method, apparatuses, and non-transitory computer-readable medium described herein, a duration of the timing advance may be the same as a duration of the guard time associated with the preamble, and the signal includes the payload.

In some examples of the method, apparatuses, and non-transitory computer-readable medium described herein, a first duration of the timing advance may be less than a second duration of the guard time associated with the preamble, where determining the signal further may include operations, features, means, or instructions for generating a weighted overlap and add (WOLA) to be transmitted during a third duration between the preamble and the payload, where the signal includes the WOLA and at least a portion of the payload.

In some examples of the method, apparatuses, and non-transitory computer-readable medium described herein, at least a portion of the signal includes at least a portion of the payload.

Some examples of the method, apparatuses, and non-transitory computer-readable medium described herein may further include operations, features, means, or instructions for setting a duration of a transmission gap associated with the random access channel uplink transmission to zero, where transmitting the preamble, the signal, and the payload may be based on setting the duration to zero.

In some examples of the method, apparatuses, and non-transitory computer-readable medium described herein, the preamble may be configured to be used by a base station for channel estimation associated with the payload.

In some examples of the method, apparatuses, and non-transitory computer-readable medium described herein, the payload of the random access channel uplink transmission includes one or more of a demodulation reference signal, a physical uplink shared channel, or a guard time.

Some examples of the method, apparatuses, and non-transitory computer-readable medium described herein may further include operations, features, means, or instructions for skipping the guard time of the preamble by transmitting the signal during the guard time, where the signal includes one or more of a cyclically extended preamble signal, a cyclically extended payload signal, at least a portion of the payload, or a weighted overlap and add (WOLA) signal.

A method of wireless communications at a base station is described. The method may include receiving a random access channel uplink transmission that includes a preamble and a payload, determining that the random access channel uplink transmission is asynchronous based on receiving the random access channel uplink transmission, and performing channel estimation for the payload using the preamble based on the random access channel uplink transmission being asynchronous.

An apparatus for wireless communications at a base station is described. The apparatus may include a processor, memory in electronic communication with the processor, and instructions stored in the memory. The instructions may be executable by the processor to cause the apparatus to receive a random access channel uplink transmission that includes a preamble and a payload, determine that the random access channel uplink transmission is asynchronous based on receiving the random access channel uplink transmission, and perform channel estimation for the payload using the preamble based on the random access channel uplink transmission being asynchronous.

Another apparatus for wireless communications at a base station is described. The apparatus may include means for receiving a random access channel uplink transmission that includes a preamble and a payload, determining that the random access channel uplink transmission is asynchronous based on receiving the random access channel uplink transmission, and performing channel estimation for the payload using the preamble based on the random access channel uplink transmission being asynchronous.

A non-transitory computer-readable medium storing code for wireless communications at a base station is described. The code may include instructions executable by a processor to receive a random access channel uplink transmission that includes a preamble and a payload, determine that the random access channel uplink transmission is asynchronous based on receiving the random access channel uplink transmission, and perform channel estimation for the payload using the preamble based on the random access channel uplink transmission being asynchronous.

Some examples of the method, apparatuses, and non-transitory computer-readable medium described herein may further include operations, features, means, or instructions for transmitting, to a user equipment, a mapping of time and frequency resources for the random access channel uplink transmission and a waveform generation configuration for the random access channel uplink transmission, where performing the channel estimation may be based on transmitting the mapping.

Some examples of the method, apparatuses, and non-transitory computer-readable medium described herein may further include operations, features, means, or instructions for determining a mapping for resources of the preamble and resources of the payload based on determining that the random access channel uplink transmission may be asynchronous, where performing the channel estimation may be based on determining the mapping.

Some examples of the method, apparatuses, and non-transitory computer-readable medium described herein may further include operations, features, means, or instructions for determining a first radio frequency resource of the preamble and a second radio frequency resource of the payload based on the receiving the random access channel uplink transmission, where performing the channel estimation may be based on determining the first radio frequency resource and the second radio frequency resource.

In some examples of the method, apparatuses, and non-transitory computer-readable medium described herein, the second radio frequency resource may be the same as the first radio frequency resource.

In some examples of the method, apparatuses, and non-transitory computer-readable medium described herein, the second radio frequency resource partially overlaps with the first radio frequency resource.

In some examples of the method, apparatuses, and non-transitory computer-readable medium described herein, the second radio frequency resource occupies a portion of the first radio frequency resource.

Some examples of the method, apparatuses, and non-transitory computer-readable medium described herein may further include operations, features, means, or instructions for receiving a second preamble of a second random access channel uplink transmission over a third radio frequency resource and a second payload of the second random access channel uplink transmission over a fourth radio frequency resource that at least partially overlaps with the first radio frequency resource and the third radio frequency resource, determining that the second random access channel uplink transmission may be synchronous based on receiving the second random access channel uplink transmission, and performing channel estimation for the second payload using at least a portion of the preamble and at least a portion of the second preamble based on the second random access channel uplink transmission being synchronous.

In some examples of the method, apparatuses, and non-transitory computer-readable medium described herein, the second radio frequency resource may be the same as the first radio frequency resource.

In some examples of the method, apparatuses, and non-transitory computer-readable medium described herein, the second radio frequency resource occupies a portion of the first radio frequency resource.

In some examples of the method, apparatuses, and non-transitory computer-readable medium described herein, the second payload may be associated with the preamble and the second preamble.

In some examples of the method, apparatuses, and non-transitory computer-readable medium described herein, performing the channel estimation further may include operations, features, means, or instructions for ignoring a demodulation reference signal portion of the payload.

Some examples of the method, apparatuses, and non-transitory computer-readable medium described herein may further include operations, features, means, or instructions for determining that a user equipment may be in a radio resource control idle state or a radio resource control inactive state, where determining that the random access channel uplink transmission may be asynchronous may be based on determining that the user equipment may be in the radio resource control idle state or the radio resource control inactive state.

In some examples of the method, apparatuses, and non-transitory computer-readable medium described herein, the preamble may be configured to be used for the channel estimation associated with the payload.

In some examples of the method, apparatuses, and non-transitory computer-readable medium described herein, the random access channel uplink transmission includes a two-step random access channel uplink transmission.

In some examples of the method, apparatuses, and non-transitory computer-readable medium described herein, the payload of the random access channel uplink transmission includes one or more of a demodulation reference signal, a physical uplink shared channel, or a guard time.

In some examples of the method, apparatuses, and non-transitory computer-readable medium described herein, a mapping for resources of the preamble and resources of the payload associated with asynchronous uplink transmissions may be different than a mapping associated with synchronous uplink transmissions.

A method of wireless communications at a base station is described. The method may include receiving a random access channel uplink transmission that includes a preamble and a payload, determining that a signal is received during a guard time of the preamble based on receiving the random access channel uplink transmission, and performing channel estimation for the payload using the preamble based on determining that the signal is received during the guard time of the preamble.

An apparatus for wireless communications at a base station is described. The apparatus may include a processor, memory in electronic communication with the processor, and instructions stored in the memory. The instructions may be executable by the processor to cause the apparatus to receive a random access channel uplink transmission that includes a preamble and a payload, determine that a signal is received during a guard time of the preamble based on receiving the random access channel uplink transmission, and perform channel estimation for the payload using the preamble based on determining that the signal is received during the guard time of the preamble.

Another apparatus for wireless communications at a base station is described. The apparatus may include means for receiving a random access channel uplink transmission that includes a preamble and a payload, determining that a signal is received during a guard time of the preamble based on receiving the random access channel uplink transmission, and performing channel estimation for the payload using the preamble based on determining that the signal is received during the guard time of the preamble.

A non-transitory computer-readable medium storing code for wireless communications at a base station is described. The code may include instructions executable by a processor to receive a random access channel uplink transmission that includes a preamble and a payload, determine that a signal is received during a guard time of the preamble based on receiving the random access channel uplink transmission, and perform channel estimation for the payload using the preamble based on determining that the signal is received during the guard time of the preamble.

Some examples of the method, apparatuses, and non-transitory computer-readable medium described herein may further include operations, features, means, or instructions for transmitting, to a user equipment, a mapping of time and frequency resources for the random access channel uplink transmission and a waveform generation configuration for the random access channel uplink transmission, where performing the channel estimation may be based on transmitting the mapping.

Some examples of the method, apparatuses, and non-transitory computer-readable medium described herein may further include operations, features, means, or instructions for determining that the random access channel uplink transmission may be asynchronous based on receiving the random access channel uplink transmission, where performing the channel estimation may be based on the random access channel uplink transmission being asynchronous.

Some examples of the method, apparatuses, and non-transitory computer-readable medium described herein may further include operations, features, means, or instructions for determining a waveform configuration of the random access channel uplink transmission based on receiving the random access channel uplink transmission, where performing the channel estimation may be based on determining the waveform configuration of the random access channel uplink transmission.

In some examples of the method, apparatuses, and non-transitory computer-readable medium described herein, the waveform configuration may be a static configuration.

In some examples of the method, apparatuses, and non-transitory computer-readable medium described herein, the signal received during the guard time of the preamble includes a cyclic extension of a waveform of the preamble.

In some examples of the method, apparatuses, and non-transitory computer-readable medium described herein, the cyclic extension of the preamble includes a cyclic postfix of the preamble.

In some examples of the method, apparatuses, and non-transitory computer-readable medium described herein, the signal received during the guard time of the preamble includes a portion of the payload advanced in time.

In some examples of the method, apparatuses, and non-transitory computer-readable medium described herein, the signal received during the guard time of the preamble includes at least a portion of a weighted overlap and add (WOLA) and at least a portion of the payload.

In some examples of the method, apparatuses, and non-transitory computer-readable medium described herein, the random access channel uplink transmission includes a continuous transmission and does not include a transmission gap.

In some examples of the method, apparatuses, and non-transitory computer-readable medium described herein, the preamble may be configured to be used for the channel estimation associated with the payload.

In some examples of the method, apparatuses, and non-transitory computer-readable medium described herein, the payload of the random access channel uplink transmission includes one or more of a demodulation reference signal, a physical uplink shared channel, or a guard time.

In some examples of the method, apparatuses, and non-transitory computer-readable medium described herein, receiving the random access channel uplink transmission may include operations, features, means, or instructions for receiving the signal during the guard time of the preamble, where determining that the signal may be received during the guard time of the preamble may be based on receiving the signal during the guard time of the preamble.

In some examples of the method, apparatuses, and non-transitory computer-readable medium described herein, at least a portion of the signal includes at least a portion of the payload.

BRIEF DESCRIPTION OF THE DRAWINGS

FIGS. 7A and 7B illustrate examples of random access messages that support resource mapping and waveform generation for uplink transmission in accordance with aspects of the present disclosure.

DETAILED DESCRIPTION

Figure 1:
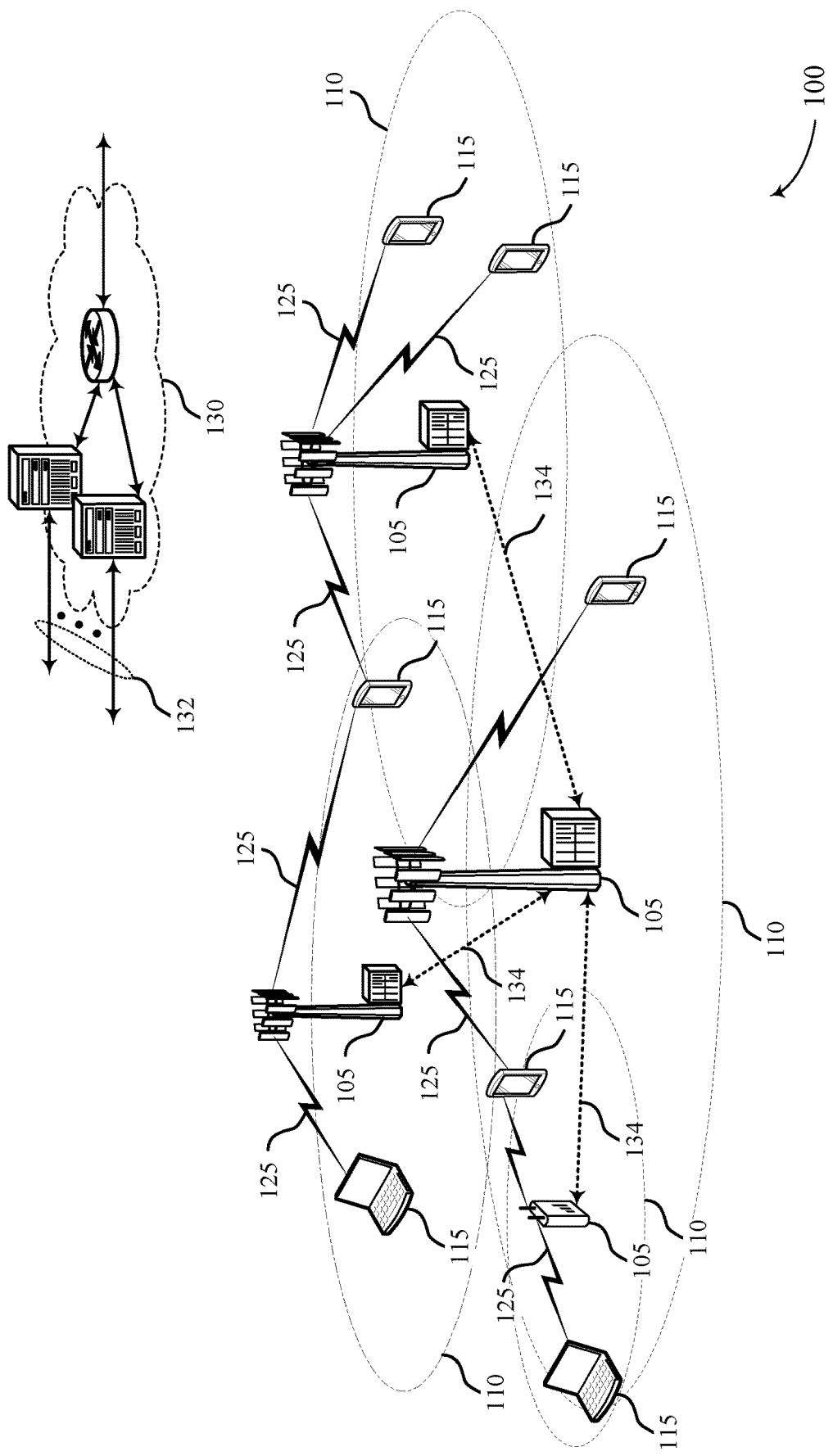
FIG. 1 illustrates an example of a wireless communications system that supports resource mapping and waveform generation for uplink transmission in accordance with aspects of the present disclosure.

A user equipment (UE) may perform a random access procedure (for example, a random access channel (RACH) procedure) with a base station to access a wireless network. Examples of RACH procedures may be performed when initially accessing the wireless network or during a handover. After successfully performing the random access procedure, the UE and the base station may establish a data connection to communicate subsequent transmissions of data and other communications. That is, the UE and the base station may establish a radio resource control (RRC) configuration for the data connection, and the base station may allocate resources (for example, time, frequency, or spatial resources) for uplink control transmissions such as scheduling requests. After the random access procedure, the UE may be in a connected state with the base station.

In some examples, the UE may be configured to perform a two-step random access procedure or a four-step random access procedure. In a two-step random access procedure the UE and the base station may exchange relatively fewer messages than in a four-step random access procedure. In the two-step random access procedure, the UE may transmit to the base station a random access message (for example, MsgA). In response to the random access message, the base station may transmit to the UE a response message, such as a random access response message (for example, MsgB).

The UE may transmit the random access message (for example, MsgA) to the base station, for example, on a physical random access channel (PRACH), on a physical uplink shared channel (PUSCH), or using other configured resources. The random access message may include a preamble and a data payload. In the two-step random access procedure, if the base station successfully receives the random access message, the base station may transmit a random access response message (for example, MsgB) to the UE. The random access response message may include an acknowledgement indicating to the UE that the base station successfully received and decoded all or a portion of the random access message, a scheduling grant indicating a set of resources for the UE to use to transmit a further data transmission, or a network identifier (for example, a cell radio network temporary identifier (C-RNTI)) for subsequent communication with the UE, among other information.

The preamble (in some cases referred to a RACH preamble, or PRACH preamble) may be or may include a sequence of symbols selected from a group of predefined sequences. The preamble may indicate to the base station the presence of a random access attempt and allow the base station to determine a delay (such as a timing delay) between the base station and the UE. The preamble of the random access message may, in some examples, be defined by the sequence and a cyclic prefix. In some instances, a preamble sequence may be defined based in part on a Zadoff-Chu sequence. The UE may, in some examples, use a guard period to manage timing uncertainty associated with the random access message transmission. For example, before beginning the random access procedure, the UE may obtain downlink synchronization with the base station based in part on a cell-search procedure. However, because the UE may not have obtained uplink synchronization with the base station, there may be an uncertainty in uplink timing due to the location of the UE in the cell (such as geographic coverage area of base station) not being known. In some examples, the uncertainty in uplink timing may be based in part on a dimension (for example, a size or area) of the cell. In some examples, the UE may also transmit one or more reference signals with the payload of the random access message, for example, to be used for demodulation (for example, the UE may transmit a demodulation reference signal (DMRS)), or other purposes.

The UE may use a resource mapping to correlate communication resources used by a preamble and a payload of an uplink, asynchronous random access message (which may also be referred to as a random access message herein). In some examples, such a resource mapping may be a constrained resource mapping. The UE may map the preamble of the random access message to a first radio frequency resource (for example, a radio frequency spectrum or one or more resources blocks), and map the payload to a second radio frequency resource. A relationship between the first radio frequency resource and the second radio frequency resource may be based on the resource mapping. In some examples, the UE may dynamically determine the resource mapping between the preamble and the payload of the random access message. In other cases, the UE may store one or more static or semi-static resource mappings between the preamble and the payload. As indicated above, the UE may constrain a time and frequency resource mapping of the asynchronous uplink transmission of the random access message compared to a time and frequency resource mapping of synchronous uplink transmissions of random access messages. In some examples, the second radio frequency resource may partially or entirely overlap with the first radio frequency resource of the asynchronous uplink transmission.

The UE may configure the communication resources of the preamble and the payload of the uplink, asynchronous random access message such that the base station may use the preamble to perform channel estimation associated with the payload. In some examples, the time and frequency resource mapping of the uplink, asynchronous random access message may be configured by the network, and the UE may identify the time and frequency resource mapping based on decoding system information (SI). Additionally or alternatively, the time and frequency resource mapping of the uplink, asynchronous random access message may be preconfigured at the UE based on configuration rules for the random access channel procedure.

Aspects of the disclosure are initially described in the context of a wireless communications system. Aspects of the disclosure are further illustrated by and described with reference to example random access message formats, example resource mappings, and example process flows. Aspects of the disclosure are further illustrated by and described with reference to apparatus diagrams, system diagrams, and flowcharts that relate to resource mapping and waveform generation for uplink transmission.

FIG. 1 illustrates an example of a wireless communications system 100 that supports resource mapping and waveform generation for uplink transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example, synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based at least in part on listening according to different receive beam directions (for example, a beam direction determined to have a highest signal strength, highest signal-to-noise ratio, or otherwise acceptable signal quality based at least in part on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (for example, depending on the length of the cyclic prefix prepended to each symbol period). Excluding the cyclic prefix, each symbol period may contain 2048 sampling periods. In some examples, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (for example, set of subcarriers or RBs) within a carrier (for example, "in-band" deployment of a narrowband protocol type).

In a system employing MCM techniques, a resource element may consist of one symbol period (for example, a duration of one modulation symbol) and one subcarrier, where the symbol period and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz) at reduced symbol durations (for example, 16.67 microseconds). A TTI in eCC may consist of one or multiple symbol periods. In some examples, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

A UE 115 may perform a random access procedure with a base station 105 to access a wireless network (for example, wireless communications system 100), for example, when initially accessing the wireless network or during a handover procedure. In some examples, the random access procedure may be performed as a two-step random access procedure or a four-step random access procedure. In some examples, before establishing a connection for communications on the shared radio frequency spectrum band, the UE 115 or the base station 105 may utilize a channel access procedure (for example, an LBT procedure) to determine whether the time and frequency resources for the channel are available, which may prevent interference and collisions with another random access message, multi-user interference, another UE and another base station, higher priority transmissions (for example, radar), and the like. For example, before one or more of the messages of a random access procedure, the UE 115 or the base station 105 may perform an LBT procedure to contend for access to the shared radio frequency spectrum band.

In some examples, the UE 115 may be configured to perform a four-step random access procedure. The four-step random access procedure may, for example, include a random access request message, a random access response message, an RRC message, or a contention resolution message. In some examples, these messages may include, or be referred to as, Msg1, Msg2, Msg3, and Msg4, respectively. Each of the messages of the four-step random access procedure may be communicated using corresponding sets of resources (for example, corresponding sets of time, frequency, or spatial resources).

According to the four-step random access procedure, the UE 115 may transmit to the base station 105 a first message (for example, Msg1), for example, a random access request message. In response, the base station 105 may transmit to the UE 115 a second message (for example, Msg2). The second message may include a grant of uplink resources for the UE 115 to transmit, to the base station 105, a third message such as, for example, an RRC message (for example, Msg3) requesting a new or reconfigured connection with the base station 105. In some examples, the four-step random access procedure may include the base station 105 transmitting, to the UE 115, a fourth message such as, for example, a contention resolution message (for example, Msg4), or other downlink signaling, such as an RRC message, to confirm the requested new or reconfigured connection. After successfully performing the random access procedure, the UE 115 and the base station 105 may establish a data connection to communicate subsequent transmissions of data and other communications. That is, the UE 115 and the base station 105 may establish an RRC configuration for the data connection, and the base station 105 may allocate resources (for example, time, frequency, or spatial resources) for uplink control transmissions such as scheduling requests. After the random access procedure, the UE 115 may be in a connected state with the base station 105.

In some examples, the UE 115 and the base station 105 may perform the four-step random access procedure while operating in a shared or unlicensed radio frequency spectrum bandwidth. In some examples, other communications devices (for example, other UEs 115, base stations 105) in the relatively nearby vicinity may also send transmissions using resources of the shared radio frequency spectrum bandwidth (the resources, for example, at least partially overlapping a set of resources to be used for the four-step random access procedure). In such cases, communications to or from the other devices on overlapping time, frequency, and space resources of the shared radio frequency spectrum band may collide with the messages communicated between the UE 115 and the base station 105 for the four-step random access procedure.

In some examples, if one message of the random access procedure is not correctly received, the random access procedure may fail (for example, due to the deterministic relationship, and timings for, one message to the next in the random access procedure). For example, if the random access response message collides with another transmission from another device in the vicinity of the UE 115 or the base station 105 (the other device transmitting using the same or an overlapping set of resources), the UE 115 may not correctly receive the random access response message including the grant for the first set of uplink resources on which to transmit the RRC message to the base station 105.

In this case, the random access procedure fails, and the UE 115 and the base station 105 may restart a new random access procedure, for example, from the first message (for example, via a new random access request message). In this way, for example, one message collision may cause a failure to successfully complete a random access procedure including one uplink grant in the random access response message, which may result in inefficient resource utilization or communications delays (for example, a delay in obtaining access to a network).

In some examples, the UE 115 may be configured to perform a two-step random access procedure. For example, the UE 115 may use the two-step random access procedure when an amount of data to be transferred is below a threshold amount of data. In a two-step random access procedure the UE 115 and the base station 105 may exchange relatively fewer messages than in a four-step random access procedure (that is, two messages versus four messages). In the two-step random access procedure, the UE 115 may transmit, to the base station 105, a single random access message (for example, MsgA). In response to the random access message, the base station 105 may transmit, to the UE 115, a single response message, such as a random access response message (for example, MsgB).

As compared to the four messages of a four-step random access procedure, for example, the random access message of the two-step random access procedure may combine all or a portion of the Msg1 and the Msg3 of a four-step random access procedure. The UE 115 may transmit the random access message to the base station, for example, on a PRACH, on a PUSCH, or using other configured resources. The random access message may include a preamble and a data payload. In some examples, the UE 115 may transmit the preamble and the data payload using different numerologies (that is, different transmission waveform characteristics, such as subcarrier spacing, cyclic prefix size), different sets of transmission resources (for example, time, frequency, or spatial resources), different portions of a carrier, different bandwidth parts, different power control schemes (for example, using different transmit powers), or different sampling rates.

In the two-step random access procedure, before transmitting the preamble of the random access message, the UE 115 may perform an LBT procedure to ascertain that a set of resources is available for transmission (for example, a set of time, frequency, or spatial resources). If the LBT procedure is successful, the UE 115 may transmit the preamble of the random access message to the base station 105. The set of resources for which the UE 115 performed the LBT procedure may be a different set of resources than the set of resources with which the UE 115 is to transmit the data payload. Additionally, the set of resources used to transmit the preamble may be associated with a different numerology (for example, a different subcarrier spacing) than the set of resources used to transmit the data payload. Thus, in some cases (for example, after transmitting the preamble), the UE 115 may perform a second LBT procedure during a tuning gap to ascertain that the set of resources for transmitting the data payload is available for transmission.

In the two-step random access procedure, if the base station 105 successfully receives the random access message, the base station 105 may also perform an LBT procedure for transmitting, to the UE 115, the random access response message of the two-step random access procedure. As compared to the four messages of a four-step random access procedure, for example, the random access response message of the two-step random access procedure may combine all or a portion of the Msg2 and the Msg4 of the four-step random access procedure. If the LBT procedure is successful, the base station 105 may transmit the random access response message to the UE 115 using, for example, a physical downlink control channel (PDCCH) or a physical downlink shared channel (PDSCH). For example, the base station 105 may transmit control information using the PDCCH including a grant for the PDSCH, and the PDSCH payload may include data of the random access response message. For example, the random access response message may include an acknowledgement indicating to the UE 115 that the base station 105 successfully received and decoded all or a portion of the random access message, a scheduling grant indicating a set of resources for the UE 115 to use to transmit a further data transmission, or a network identifier (for example, a cell radio network temporary identifier (C-RNTI)) for subsequent communication with the UE 115, among other information. If, however, the base station 105 does not detect the random access preamble, or the LBT procedure is unsuccessful, the base station 105 may not transmit the random access response message.

After successfully performing the random access procedure, the UE 115 and the base station 105 may, or may not, establish a data connection for subsequent transmissions of data and other communications. Accordingly, in the two-step random access procedure, relative to the four-step random access procedure, the UE 115 may be capable of transmitting data (such as the data payload) to the base station 105 without transitioning to a connected state for data transmission. Accordingly, a successful two-step random access procedure may provide, for example, relatively improved latency and faster connection speeds than a successful four-step random access procedure, especially in the case of relatively small data payloads or intermittent data.

A UE 115 may transmit a random access message to a base station 105 in an asynchronous, uplink random access message, where there may be a timing offset between portions of the message in the uplink transmission. The uplink transmission may be asynchronous due to insufficient timing information, for example. A large timing offset may lead to degraded channel estimation of portions of the message, the base station failing to detect the message, interference between portions of the message, or interference with other UEs 115.

Generally, the described techniques enable the UE 115 to adjust the asynchronous, uplink random access message that is transmitted to the base station 105. In some examples, the UE 115 may use a constrained mapping of time and frequency resources for the asynchronous, uplink random access message or transmit all portions of the message in a continuous transmission to reduce the impact of the asynchronous, uplink random access message. The UE 115 may also adjust the timing of portions of the message to improve transmission of the message. The base station 105 may use a portion of the message, such as a preamble, to perform channel estimation for another portion of the message, such as a payload, to improve decoding of the transmitted message. Additionally, the UE 115 may configure a waveform of the message to improve the continuous transmission of the message, for example by reducing interference between portions of the message.

Figure 2:
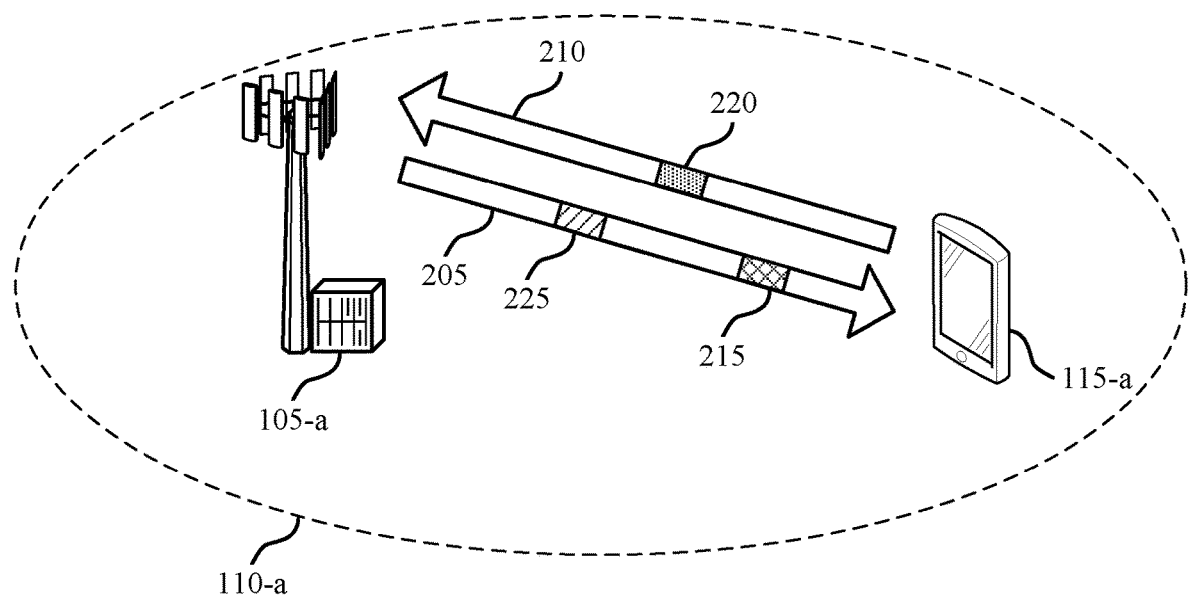
FIG. 2 illustrates an example of a wireless communications system that supports resource mapping and waveform generation for uplink transmission in accordance with aspects of the present disclosure.

FIG. 2 illustrates an example of a wireless communications system 200 that supports resource mapping and waveform generation for uplink transmission in accordance with aspects of the present disclosure. In some examples, wireless communications system 200 may implement aspects of wireless communications system 100. The wireless communications system 200 includes a base station 105-*a* and a UE 115-*a*, which may be examples of the corresponding devices as described with reference to FIG. 1.

In some examples, the UE 115-*a* may perform a connection procedure (for example, a random access procedure, such as a RACH procedure) to establish a connection with the base station 105-*a*. For example, the UE 115-*a* may perform a random access procedure, such as a two-step random access procedure (for example, a two-step RACH procedure), to establish a connection to be used to communicate using uplink transmissions 210 and downlink transmissions 205. In some examples, the base station 105-*a* may transmit configuration information 215 that may be received by the UE 115-*a*, and other UEs, that may provide configuration information for random access procedures available at the base station 105-*a*, one or more parameters associated with the random access procedures (for example, a preamble length, transmission power), wireless resources for random access message transmissions (for example, time, frequency, or spatial resources, RO windows), or others.

In some examples, the UE 115-*a* may determine to perform a two-step random access procedure, and may transmit an uplink, initial random access message 220 to the base station 105-*a*, for example, based on the configuration information 215, an RRC state, a cell size, UE capabilities or a path loss metric, among other possibilities. The initial random access message 220, which may be an example of a MsgA transmission of a two-step RACH procedure, may include a random access preamble and a random access payload. The base station 105-*a* may receive the initial random access message 220 and perform processing on the message to determine a random access response 225, which may be an example of a MsgB transmission of a two-step RACH procedure, that may be transmitted to the UE 115-*a* to complete the random access procedure.

As compared to a four-step random access procedure, the random access message 220 of the two-step random access procedure may combine all or a portion of the Msg1 and the Msg3 of the four-step random access procedure. The UE 115-*a* may transmit the initial random access message 220 to the base station 105-*a*, for example, on a PRACH, on a PUSCH, or using other configured resources (for example, identified via configuration information 215). In some examples, the UE 115-*a* may transmit the preamble and the data payload using different numerologies (for example, different transmission waveform characteristics such as subcarrier spacing, cyclic prefix size), different sets of transmission resources (for example, time, frequency, or spatial resources), different portions of a carrier, different bandwidth parts, different power control schemes (for example, using different transmit powers), different sampling rates, or different beam configurations for UE transmitting and base station receiving.

The preamble (in some cases referred to a RACH preamble, or PRACH preamble) may be a sequence of symbols selected from a group of predefined sequences. The preamble may indicate to the base station 105-*a* the presence of a random access attempt and allow the base station 105-*a* to determine a delay (such as a timing delay) between the base station 105-*a* and the UE 115-*a*. The preamble of the random access message 220 may, in some examples, be defined by the sequence and a cyclic prefix. In some instances, a preamble sequence may be defined based in part on a Zadoff-Chu sequence. The UE 115-*a* may, in some examples, use a guard period to manage timing uncertainty of the random access message 220 transmission. For example, before beginning the random access procedure, the UE 115-*a* may obtain downlink synchronization with the base station 105-*a* based in part on a cell-search procedure. However, because the UE 115-*a* has not yet obtained uplink synchronization with the base station 105-*a*, there may be an uncertainty in uplink timing due to the location of the UE 115-*a* in the cell (such as geographic coverage area of base station 105-*a*) not being known. In some examples, the uncertainty in uplink timing may be based in part on a dimension (for example, a size or area) of the cell. In some examples, the UE 115-*a* may also transmit one or more reference signals with the payload of the random access message, for example, to be used for demodulation (for example, the UE 115-*a* may transmit a DMRS), or other purposes.

In some examples, the UE 115-*a* may determine that the uplink transmission including the random access message 220 is asynchronous. The UE 115-*a* may determine the uplink transmission is asynchronous based on identifying insufficient timing information (for example, outdated timing information) or absent timing information for the asynchronous transmission. In some examples, a time alignment timer of the UE 115-*a* may stop (for example, expire), which may cause an uplink transmission to be asynchronous. In some examples, the UE 115-*a* may determine that the uplink transmission is asynchronous based on determining that the UE 115-*a* is in a particular RRC state. For example, when the UE 115-*a* is in an RRC idle state or an RRC inactive state, the UE 115-*a* may determine that the uplink transmission is asynchronous.

The UE 115-*a* may map the asynchronous, uplink random access message to time and frequency resources used by random access message 220. For example, the UE 115-*a* may map the preamble of the random access message 220 to a first radio frequency resource, and map the payload to a second radio frequency resource. In some examples, the random access message 220 may be an asynchronous, uplink random access message. In some examples, the second radio frequency resource may partially or entirely overlap with the first radio frequency resource of the asynchronous, uplink random access message. In some examples, the UE 115-*a* may dynamically determine the resource mapping between the preamble and the payload of the asynchronous, uplink random access message. In other cases, the UE 115-*a* may store one or more static or semi-static resource mappings between the preamble and the payload of the random access message 220. In some examples, such the resource mappings may be constrained. For example, the UE 115-*a* may constrain a time and frequency resource mapping of the asynchronous, uplink random access message compared to a time and frequency resource mapping of synchronous uplink transmissions.

In some examples, the UE 115-*a* may configure the communication resources of the preamble and the payload of the random access message 220 such that the base station 105-*a* may use the preamble to perform channel estimation associated with the payload. In some examples, the time and frequency resource mapping of the asynchronous, uplink random access message may be configured by the network, and the UE 115-*a* may identify the time and frequency resource mapping based on decoding SI. Additionally or alternatively, the time and frequency resource mapping of the asynchronous, uplink random access message may be preconfigured at the UE 115-*a* based on configuration rules for the random access channel procedure.

Figure 3:
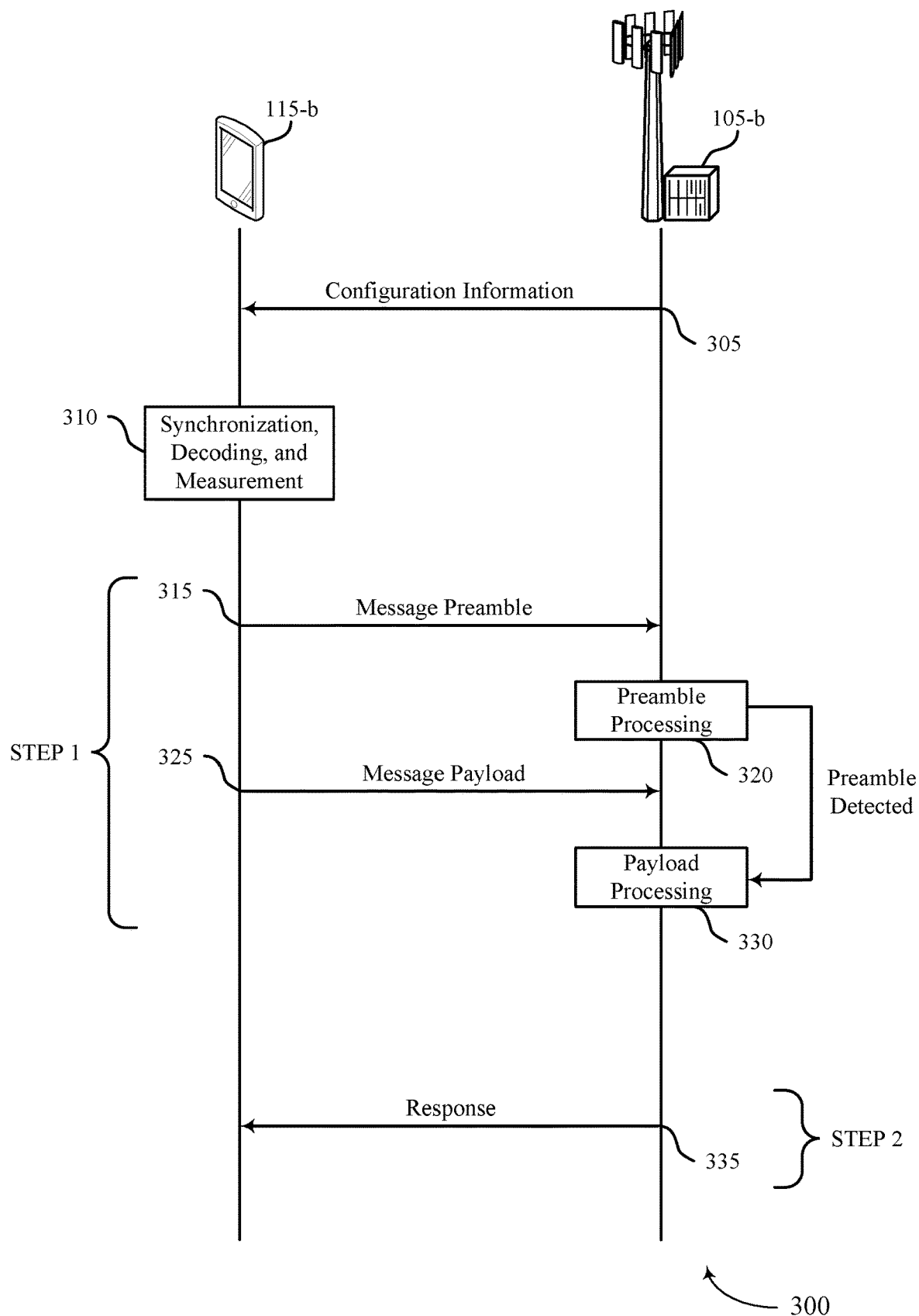
FIG. 3 illustrates an example of a process flow that supports resource mapping and waveform generation for uplink transmission in accordance with aspects of the present disclosure.

FIG. 3 illustrates an example of a process flow 300 that supports resource mapping and waveform generation for uplink transmission in accordance with aspects of the present disclosure. In some examples, process flow 300 may implement aspects of wireless communications system 100 or wireless communications system 200. Further, process flow 300 may be an example of a two-step RACH operation as implemented by a UE 115-b and a base station 105-b, which may be examples of a UE 115 and a base station 105 described with reference to FIGS. 1 and 2. In the following description of the process flow 300, the operations performed by base station 105-b and UE 115-b may be performed in different orders or at different times than those shown. Certain operations may also be left out of the process flow 300, or other operations may be added to the process flow 300. While base station 105-b and UE 115-b are shown performing a number of the operations of process flow 300, any wireless device may perform the operations shown.

At 305, base station 105-b may transmit configuration information to UE 115-b in one or more transmissions. In some examples, the configuration information may be used by the UE 115-b to configure a two-step random access procedure including configuring random access resources. In some examples, random access resources may be configured based on a preamble length, transmission channel characteristics, a channel bandwidth, a numerology for the preamble, a payload, one or more other factors, or any combinations thereof. In some examples, the configuration information may refer to broadcast signaling, RRC signaling, a SIB, SI, or some combination thereof.

At 310, UE 115-b may perform downlink synchronization procedures, SI decoding procedures, measurement procedures, among other procedures, based on the configuration information from the based station 105-b. In some examples, the UE 115-b may identify a time and frequency resource mapping for uplink transmissions based on decoding SI.

At 315, UE 115-b may transmit a random access preamble and, at 325, may transmit a random access payload. In some examples, the random access preamble and the random access payload may be transmitted as a single transmission, and may collectively be referred to as an uplink random access message (for example, a MsgA). In some examples, MsgA may generally refer to a random access message, and may be transmitted via a PRACH or a DMRS/PUSCH. The MsgA may include, for example, an RRC request, small data from UP/CP, UCI. In some examples, the UE 115-b may determine that the uplink random access message is asynchronous. The UE 115-b may determine the uplink random access message is asynchronous based on identifying insufficient timing information (for example, outdated timing information) or absent timing information for the asynchronous, uplink random access message. In some examples, a time alignment timer of the UE 115-b may stop (for example, expire), which may cause an uplink random access message to be asynchronous. In some examples, the UE 115-b may determine the that the uplink random access message is asynchronous based on determining the UE 115-b is in a particular RRC state. For example, when the UE 115-b is in an RRC idle state or an RRC inactive state, the UE 115-b may determine that the uplink random access message is asynchronous.

The UE 115-b may map the asynchronous, uplink random access message to time and frequency resources used by the random access preamble and the random access payload. In some examples, such a resource mapping may be a constrained resource mapping. In some examples, the UE 115-b may transmit the random access preamble over a first radio frequency resource at 315 and transmit the random access payload over a second radio frequency resource at 325. The second radio frequency resource may equal the first radio frequency resource, or the second radio frequency resource may be a subset of the first radio frequency resource, or the second radio frequency resource may partially overlap with the first radio frequency resource.

In some examples, the UE 115-a may configure the communication resources of the random access preamble and the random access payload such that the base station 105-b may use the preamble to perform channel estimation associated with the payload. At 320, base station 105-b may perform a preamble detection procedure and identify the random access preamble of the UE 115-b.

Based on the detected preamble, the base station 105-b may, at 330, decode the random access payload. In some examples, the base station 105 b may identify the uplink control information provided by the UE 115 b based on decoding the random access payload. In some examples, the payload may include a DMRS, which may be used by the base station 105 b to assist in the demodulation and decoding of the payload.

In some examples, the base station 105-b may determine not to process the DMRS included in the payload based on performing channel estimation using the random access preamble. In some examples, the random access preamble may include a guard time in which transmission is paused to allow for completion of a transmission with sufficient time to avoid interference with a subsequent transmission when timing synchronization may not occur. Pausing transmission during the guard time of the random access preamble may result in a phase discontinuity between the random access preamble and a random access payload. In some examples, such as in an asynchronous, uplink random access message, this phase discontinuity may degrade a quality of a channel estimation and a performance of a payload decoding. The base station 105 may perform additional waveform processing on the DMRS in instances in which the random access payload includes DMRS to avoid or mitigate a phase discontinuity that may be incurred by a guard time of the random access preamble.

At 335, base station 105-b may format a random access response based on the random access payload and may transmit the random access response to the UE 115-b, for example, in the form of a MsgB of a two-step random access procedure. The base station 105-b may transmit the random access response via a DMRS/PDCCH or a DMRS/PUSCH. The random access response may include, for example, equivalents of Msg2 and Msg4 of a four-step random access procedure. Following the transmission and reception of the random access response, the base station 105-b and UE-115 b may, for example, initiate an RRC connection establishment procedure, an RRC re-establishment procedure, a handover procedure, a timing synchronization procedure, or any combinations thereof. In some examples, if the random access message is not received, or not properly detected, by the base station 105-b, the base station 105-b may not transmit the random access response.

Figure 4:
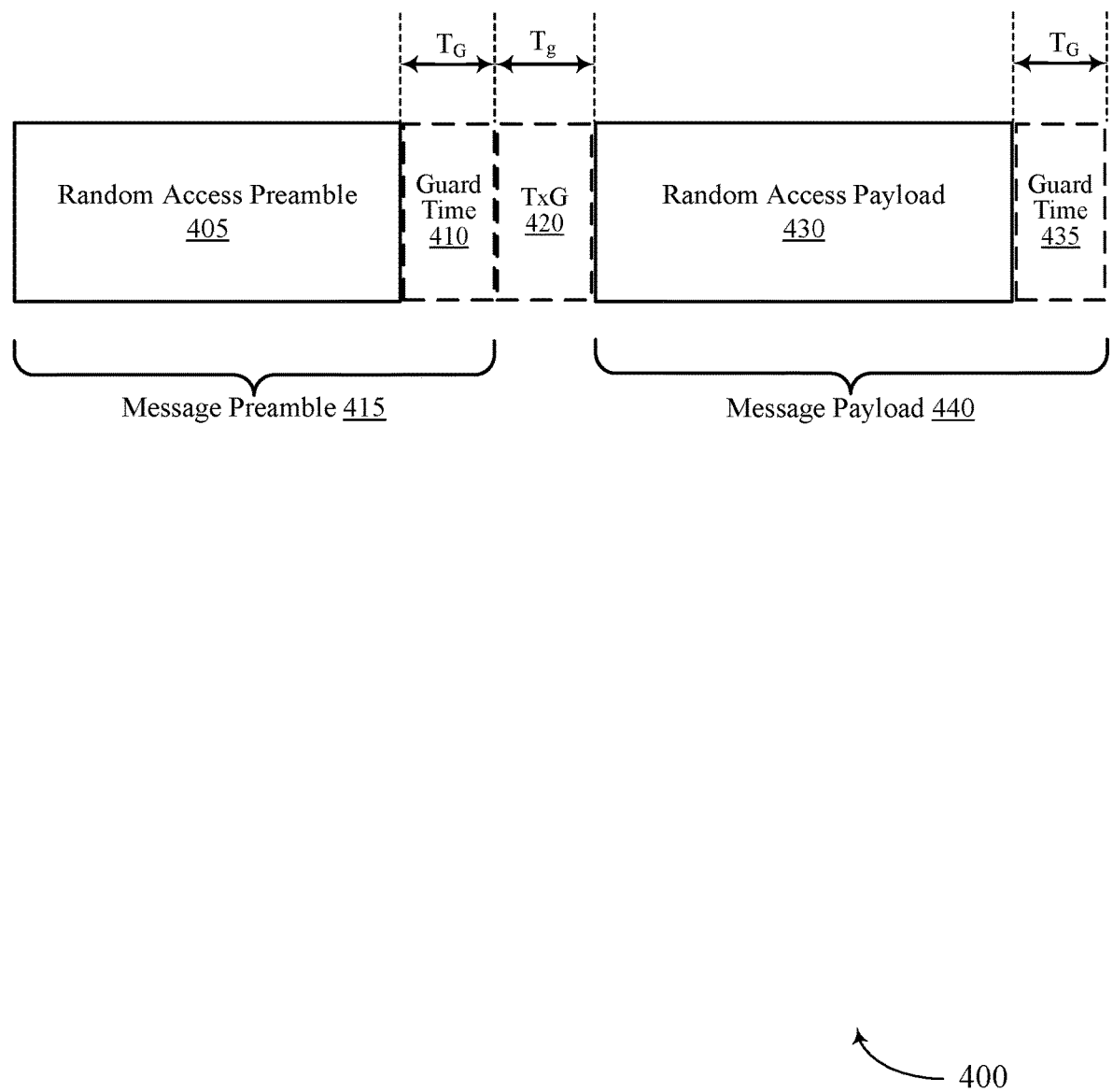
FIG. 4 illustrates an example of a random access message that supports resource mapping and waveform generation for uplink transmission in accordance with aspects of the present disclosure.

FIG. 4 illustrates an example of a random access message 400 that supports resource mapping and waveform generation for uplink transmission in accordance with aspects of the present disclosure. In some examples, random access message 400 may implement aspects of wireless communications system 100 or wireless communications system 200. In this example, the random access message 400 (which may, for example, be an uplink, asynchronous random access message) may be an initial random access message of a two-step random access procedure (for example, MsgA of a two-step RACH procedure).

The random access message 400, in this example, may include a random access preamble 405 and a guard time 410 (which may span some duration $T_G$), which may form a message preamble 415. The random access message 400 also may include a transmission gap (TxG) 420 (which may span some duration TO, and random access payload 430. In some examples, a DMRS may be included with random access payload 430 (for example, prior to or as a part of the random access payload 430). In this example, a guard time 435 may also be provided following the random access payload 430 (which may span some duration $T_G$). The random access payload 430 and guard time 435 may form message payload 440 of the two-step random access procedure.

A UE may transmit the random access message 400 in any RRC state (for example, regardless of whether the UE has valid timing information (for example, a timing advance or a time alignment) or not). The inclusion of the guard time (for example, guard time 410 and guard time 435) may reduce, for example, inter-symbol interference (ISI), inter-carrier interference (ICI), of asynchronous transmission. In some examples, inclusion of the transmission gap (for example, TxG 420) may be desirable for both the UE and the base station to reduce implementation complexity. For example, guard time 410 and or TxG 420 may be set or utilized such that the base station may derive a timing offset of the random access payload 430 from the random access preamble 405 (for example, such that the base station has time to process the random access preamble 405 prior to detecting and decoding the random access payload 430).

For example, the inclusion of the TxG 420 may allow for retuning of transmit circuitry at a transmitting UE, performance of an LBT procedure, or any combinations thereof. In some examples, the TxG 420 be used when timing information is unknown or out of date, when a different numerology is used for the random access preamble 405 and the random access payload 430, when a different bandwidth is used for the random access preamble 405 and the random access payload 430, when a different transmission beam is used for the random access preamble 405 and the random access payload 430, when different power control schemes are used for the random access preamble 405 and the random access payload 430, when a different sampling rate is used for the random access preamble 405 and the random access payload 430, when a different transmitting or receiving beam is used for the random access preamble 405 and the random access payload 430, or any combinations thereof. Further, in some examples, when the guard time 410 is non-zero, the TxG 420 may be reduced or skipped. The term "transmission gap" may be used to generally refer to the time gap between the random access preamble 405 and the random access payload 430, which may include the guard time 410.

The guard time 410 and the guard time 435 may allow for completion of a transmission with sufficient time to avoid interference with a subsequent transmission when timing synchronization may not be established. In some examples, the duration of the guard time 410 may be dependent upon a preamble length, preamble format, or any combination thereof. For example, if the base station configures long-sequence based preambles (for example, for LTE reframing, large cells, coverage enhancement, high speed deployments), the duration of the guard time 410 may be provided that is relatively long compared to guard times provided for short-sequence based preambles. Further, in some examples, the guard time 410 may be zero.

Although the guard time 410 and the guard time 435 both span the same duration $T_G$ in FIG. 4, the guard time 410 and the guard time 435 may not necessarily span the same duration. The duration of the guard time 410 may be independent of the duration of the guard time 435. In some examples, the duration of the guard time 435 may be dependent upon a payload length, payload format, or any combination thereof.

Figure 5B:
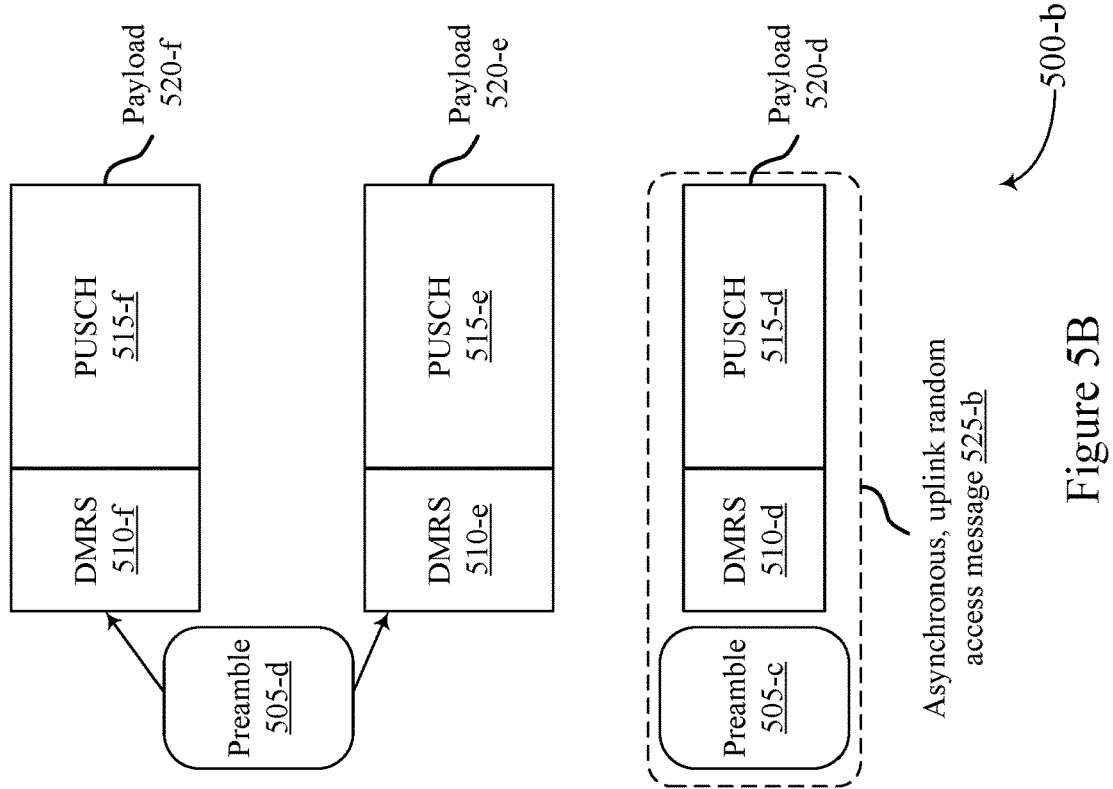
FIGS. 5A and 5B illustrate examples of uplink transmission resource mappings in accordance with aspects of the present disclosure.
Figure 5A:
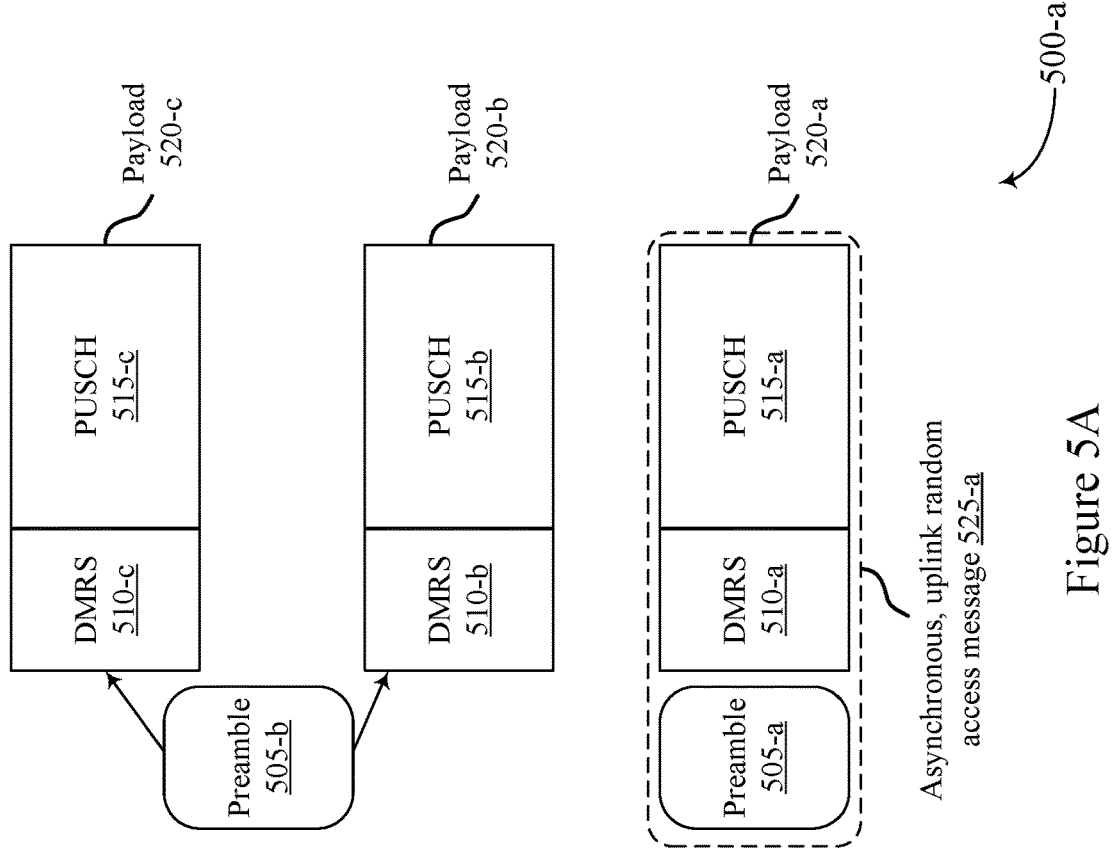

FIGS. 5A and 5B illustrate examples of uplink transmission resource mappings 500-a and 500-b in accordance with aspects of the present disclosure. In some examples, uplink transmission resource mappings 500-a and 500-b may implement aspects of wireless communications system 100 or wireless communications system 200.

A UE 115 may schedule one or more uplink transmissions, where the one or more uplink transmissions may include one or more random access messages (for example, a MsgA of a two-step RACH procedure). Each random access message may include a random access preamble 505 and a random access payload 520, where the random access payload 520 may include a DMRS 510 and a PUSCH 515. The UE 115 may determine that an uplink transmission may include an asynchronous, uplink random access message 525. In some examples, the asynchronous, uplink random access message 525 may include a random access preamble 505. In some examples, the UE 115 may identify the asynchronous, uplink random access message 525 based on identifying insufficient timing information (for example, outdated timing information) or absent timing information for the asynchronous, uplink random access message 525. In some examples, a time alignment timer of the UE 115 may stop (for example, expire), which may cause the uplink transmission to be asynchronous. In some examples, the UE 115 may determine that an uplink transmission is asynchronous based on determining the UE 115 is in an RRC state, where the RRC state may be an RRC idle state, an RRC inactive state, or an RRC connected state. For example, when the UE 115 is in an RRC idle state or an RRC inactive state, the UE 115 may determine that the asynchronous, uplink random access message 525 is asynchronous. The UE 115 may identify a synchronous or asynchronous status of each of the one or more uplink transmissions.

The UE 115 may map the one or more asynchronous, uplink random access messages 525 to time and frequency resources used by the preamble with the payload. In some examples, such a resource mapping may be a constrained resource mapping. The UE 115 may map the random access preamble 505 to a first radio frequency resource, and map the random access payload 520 to a second radio frequency resource. In some examples, the UE 115 may dynamically determine the resource mapping between the preamble and the payload of the asynchronous, uplink random access message 525. In other cases, the UE 115 may store one or more static or semi-static resource mappings between the preamble and the payload of the asynchronous, uplink random access message 525. The UE 115 may constrain a time and frequency resource mapping of the asynchronous, uplink random access message 525 compared to a time and frequency resource mapping of synchronous uplink transmissions. In some examples, the second radio frequency resource may partially or entirely overlap with the first radio frequency resource of the asynchronous, uplink random access message 525. In some examples, the second radio frequency resource may occupy a portion of the first radio frequency resource of the asynchronous, uplink random access message 525. In some examples, the second radio frequency resource may be the same as the first radio frequency resource of the asynchronous, uplink random access message 525.

In some examples, the UE 115 may configure the communication resources of the random access preamble 505 and the communication resource of the random access payload 520 such that a base station may use the random access preamble 505 to perform channel estimation associated with the random access payload 520. In some examples, the base station 105 may determine not to process the DMRS 510 based on performing channel estimation using the random access preamble 505. In some examples, pausing uplink transmissions during a guard time of the random access preamble 505 may result in a phase discontinuity between the random access preamble 505 and a random access payload 520. In some examples, such as in the asynchronous, uplink random access message 525, this phase discontinuity may degrade a quality of a channel estimation and a performance of a PUSCH decoding. The base station 105 may perform additional waveform processing on the DMRS 510 to avoid or mitigate a phase discontinuity that may be incurred by a guard time of the random access preamble 505.

In some examples, the time and frequency resource mapping of the asynchronous, uplink random access message 525 may be configured by the network, and the UE 115 may identify the time and frequency resource mapping based on decoding SI. Additionally or alternatively, the time and frequency resource mapping of the asynchronous, uplink random access message 525 may be preconfigured at the UE 115 as part of configuration rules for a random access channel procedure (for example, a two- or four-step RACH procedure).

FIG. 5A illustrates an example of an uplink transmission resource mapping 500-a for a UE 115. The uplink transmission resource mapping 500-a may include an asynchronous, uplink random access message 525-a. The asynchronous, uplink random access message 525-a may include a random access preamble 505-a, which schedules a random access payload 520-a. The random access payload 520-a may include a DMRS 510-a and a PUSCH 515-a. The uplink transmission resource mapping 500-a may further include additional uplink transmissions, which may be synchronous uplink transmissions associated with synchronous random access messages. A random access preamble 505-b may schedule the random access payloads 520-b and 520-c. Random access payload 520-b may include DMRS 510-b and PUSCH 515-b, and random access payload 520-c may include DMRS 510-c and PUSCH 515-c.

A time and frequency resource mapping of the asynchronous, uplink random access message 525-a may be constrained compared to time and frequency resource mappings of the synchronous uplink transmissions in the uplink transmission resource mapping 500-a. As illustrated in FIG. 5A, a radio frequency resource of the random access payload 520-a may be the same as a radio frequency resource of the random access preamble 505-a. In contrast, the random access payload 520-b may not overlap with the random access preamble 505-b, and the random access payload 520-c may partially overlap with the random access preamble 505-b.

FIG. 5B illustrates an example of an uplink transmission resource mapping 500-b for a UE 115. The uplink transmission resource mapping 500-b may include an asynchronous, uplink random access message 525-b. The asynchronous, uplink random access message 525-b may include a random access preamble 505-c, which schedules a random access payload 520-d. The random access payload 520-d may include a DMRS 510-d and a PUSCH 515-d. The uplink transmission resource mapping 500-b may further include additional uplink transmissions, which may be synchronous uplink transmissions associated with synchronous uplink random access messages. A random access preamble 505-d may schedule the random access payloads 520-e and 520-f. Random access payload 520-e may include DMRS 510-e and PUSCH 515-e, and random access payload 520-f may include DMRS 510-f and PUSCH 515-f.

A time and frequency resource mapping of the asynchronous, uplink random access message 525-b may be constrained compared to time and frequency resource mappings of the synchronous uplink random access message in the uplink transmission resource mapping 500-b. As illustrated in FIG. 5B, a radio frequency resource of the random access payload 520-d may occupy a portion of a radio frequency resource of the random access preamble 505-c. In contrast, the random access payload 520-e may not overlap with the random access preamble 505-d, and the random access payload 520-f may partially overlap with the random access preamble 505-d.

Figure 6B:
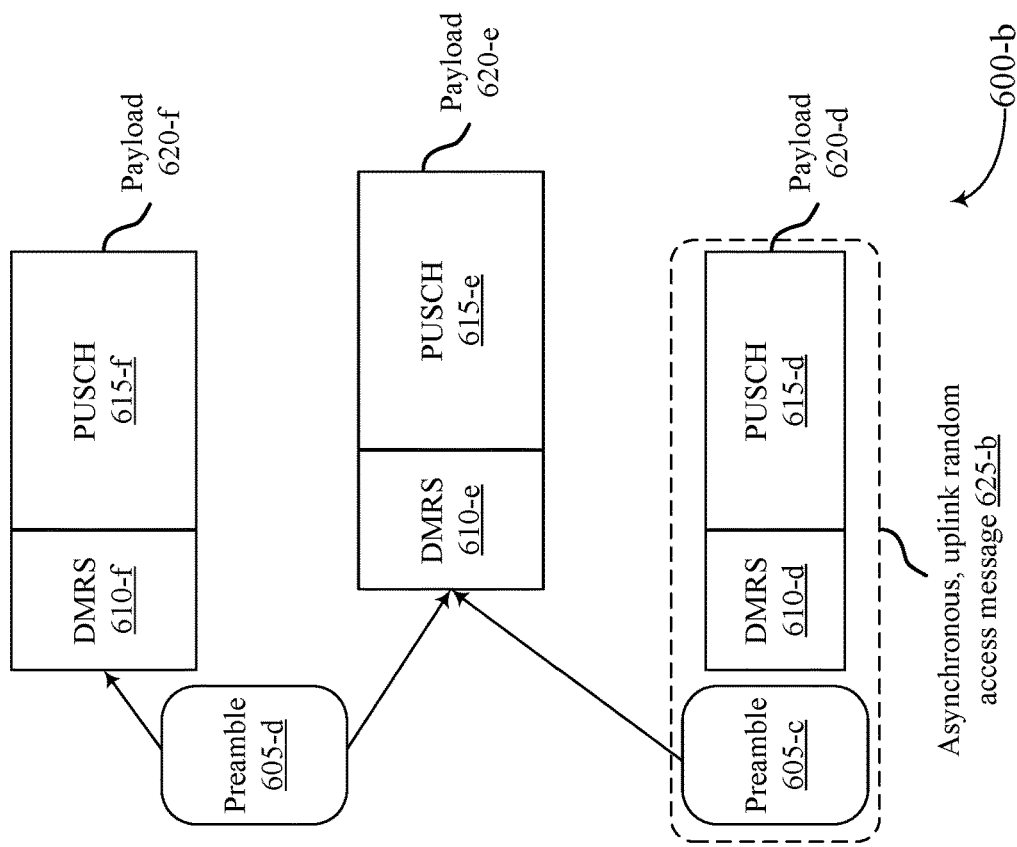
FIGS. 6A and 6B illustrate examples of uplink transmission resource mappings in accordance with aspects of the present disclosure.
Figure 6A:
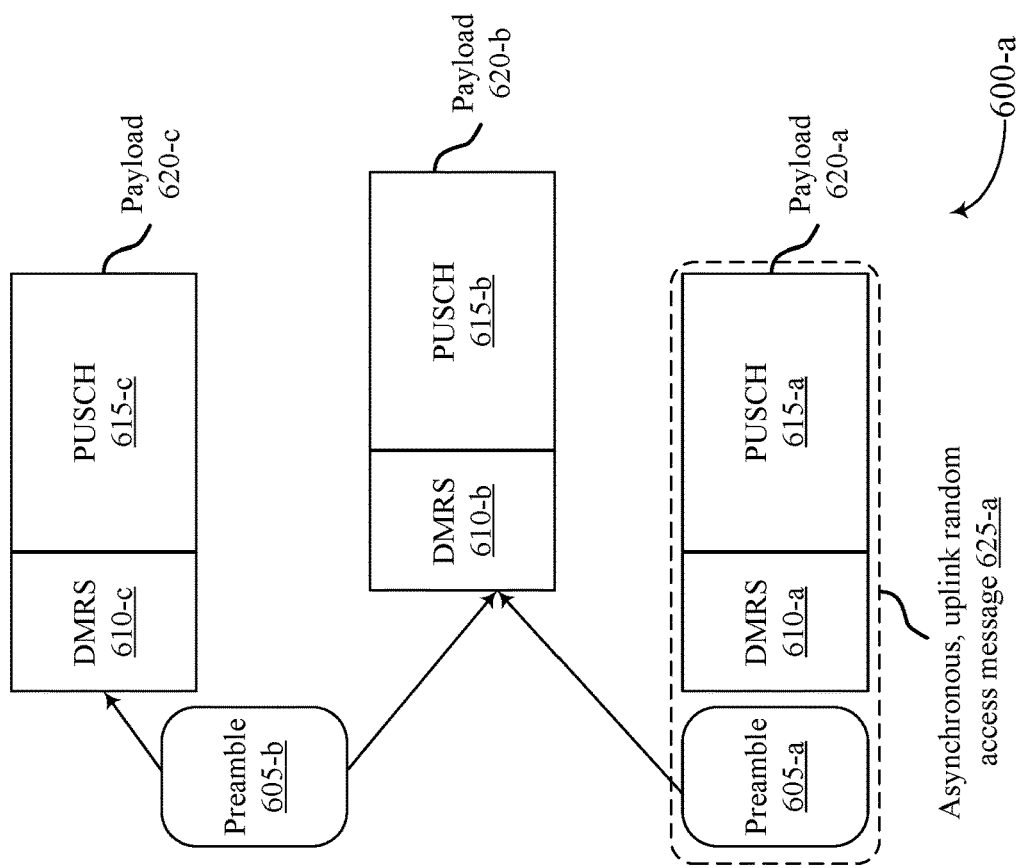

FIGS. 6A and 6B illustrate examples of uplink transmission resource mappings 600-a and 600-b in accordance with aspects of the present disclosure. In some examples, uplink transmission resource mappings 600-a and 600-b may implement aspects of wireless communications system 100 or wireless communications system 200.

A UE 115 may map one or more scheduled uplink transmissions to time and frequency resources. The UE 115 may map a random access preamble 605 to a first radio frequency resource, and map a random access payload 620, which may include a DMRS 610 and a PUSCH 615, to a second radio frequency resource. The UE 115 may constrain a time and frequency resource mapping of an asynchronous, uplink random access message 625 compared to a time and frequency resource mapping of synchronous uplink transmissions associated with synchronous uplink random access messages. In some examples, the second radio frequency resource may partially or entirely overlap with the first radio frequency resource of the asynchronous, uplink random access message 625. In some examples, the second radio frequency resource may occupy a portion of the first radio frequency resource of the asynchronous, uplink random access message 625. In some examples, the second radio frequency resource may be the same as the first radio frequency resource of the asynchronous, uplink random access message 625.

In some examples, a random access preamble 605 of an asynchronous, uplink random access message 625 may be a shared preamble, and may additionally be associated with a random access payload 620 of a synchronous uplink transmission. Alternatively, the random access preamble 605 of the asynchronous, uplink random access message 625 may be a dedicated preamble, where the random access preamble 605 is only associated with the random access payload 620 of the asynchronous, uplink random access message 625. The UE 115 may map the random access payload 620 of the synchronous uplink transmission to a third radio frequency resource, which may partially overlap with the first radio frequency resource.

FIG. 6A illustrates an example of an uplink transmission resource mapping 600-a for a UE 115. The uplink transmission resource mapping 600-a may include an asynchronous, uplink random access message 625-a. The asynchronous, uplink random access message 625-a may include a random access preamble 605-a, which may be associated with a random access payload 620-a. The random access payload 620-a may include a DMRS 610-a and a PUSCH 615-a. The uplink transmission resource mapping 600-a may further include additional uplink transmissions, which may be synchronous uplink transmissions associated with synchronous uplink random access messages. The random access preamble 605-a may be a shared preamble, and may be associated, along with a random access preamble 605-b, with a random access payload 620-b. Random access preamble 605-b may additionally be associated a random access payload 620-c. Random access payload 620-b may include DMRS 610-b and PUSCH 615-b, and random access payload 620-c may include DMRS 610-c and PUSCH 615-c.

FIG. 6B illustrates an example of an uplink transmission resource mapping 600-b for a UE 115. The uplink transmission resource mapping 600-b may include an asynchronous, uplink random access message 625-b. The asynchronous, uplink random access message 625-b may include a random access preamble 605-c, which may be associated with a random access payload 620-d. The random access payload 620-d may include a DMRS 610-d and a PUSCH 615-d. The uplink transmission resource mapping 600-b may further include additional uplink transmissions, which may be synchronous uplink transmissions associated with synchronous uplink random access messages. The random access preamble 605-c may be a shared preamble, and may be associated, along with a random access preamble 605-d, with a random access payload 620-e. Random access preamble 605-d may additionally be associated with a random access payload 620-f. Random access payload 620-e may include DMRS 610-e and PUSCH 615-e, and random access payload 620-f may include DMRS 610-f and PUSCH 615-f.

FIGS. 7A and 7B illustrate examples of random access messages 700-a and 700-b that support resource mapping and waveform generation for uplink transmission in accordance with aspects of the present disclosure. In some examples, random access messages 700-a and 700-b may implement aspects of wireless communications system 100 or wireless communications system 200. In some examples, the random access message 700-a or 700-b may be an initial random access message of a two-step random access procedure (for example, MsgA of a two-step RACH procedure).

In a random access preamble 705 that includes a guard time, uplink transmissions may be paused for a duration $T_G$ corresponding to a duration of the guard time. Pausing the uplink transmissions may result in a phase discontinuity between the random access preamble 705 and a random access payload 710. In some examples, such as in an asynchronous, uplink random access message, this phase discontinuity may degrade a quality of a channel estimation and a performance of a PUSCH decoding. Techniques are provided herein to avoid or mitigate the phase discontinuity and potential impacts the phase discontinuity may have on the quality of the channel estimation in asynchronous, uplink random access messages.

FIG. 7A illustrates an example of a random access message 700-a that supports techniques for avoiding or mitigating a phase discontinuity between a random access preamble 705-a and a random access payload 710-a. The random access message 700-a may be transmitted by a UE 115. In some examples, the UE 115 may determine a waveform configuration of the random access message 700-a. The waveform configuration may be a static configuration (for example, a lookup table) stored by the UE 115. In some examples, the UE 115 may determine a signal to transmit during a guard time of the random access preamble 705-a. In some implementations, the signal may be an extension of the preamble 705-a. For example, the UE 115 may determine to cyclically extend a waveform of a preamble 715-a for at least part of the guard time, rather than pausing the uplink transmission, to avoid or mitigate a phase discontinuity between the random access preamble 705-a and a random access payload 710-a. A cyclic extension 720 may be a cyclic postfix of the preamble 715-a.

The UE 115 may cyclically extend a waveform of a preamble 715-a by a duration $T_G$, which corresponds to a duration of the guard time of the random access preamble 705-a. The cyclic extension 720 and the preamble 715-a may form a random access preamble 705-a without a guard time. The UE 115 may skip a transmission gap by setting a duration $T_g=0$. Skipping the transmission gap may lead to ISI between the random access preamble 705-a and a random access payload 710-a. A DMRS 725-a of the random access payload 710-a may absorb the ISI between the random access preamble 705-a and a random access payload 710-a. A base station 105 may determine not to process the DMRS 725-a contaminated by the ISI based on performing channel estimation using the random access preamble 705-a. The base station 105 may decode a PUSCH 730-a based on performing the channel estimation using the random access preamble 705-a. The random access payload 710-a may further include a guard time 735-a following the PUSCH 730-a.

In some examples, the random access preamble 705-a and the DMRS 725-a may employ different numerologies or transmission powers. The UE 115 may create or be configured with a lookup table for waveform samples of the random access preamble 705-a and the DMRS 725-a. The lookup table may be based on a deterministic mapping relationship between the random access preamble 705-a and the DMRS 725-a, or a semi-static mapping relationship between the random access preamble 705-a and the DMRS 725-a. The UE 115 may use the lookup table for waveform generation when transmitting the random access message 700-a, rather than generating a waveform dynamically. Using a lookup table may reduce a latency for a waveform synthesis by saving a radio frequency tuning gap between the random access preamble 705-a and the DMRS 725-a when the random access preamble 705-a and the DMRS 725-a employ different numerologies or transmission powers.

FIG. 7B illustrates an example of a random access message 700-b that supports techniques for avoiding or mitigating a phase discontinuity between a random access preamble 705-b and a random access payload 710-b. The random access message 700-b may be transmitted by a UE 115. The UE 115 may transmit a preamble 715-b in the random access preamble 705-b. The UE 115 may determine a signal to transmit in a duration $T_G$ that may be associated with a guard time of the random access preamble 705-b. In some implementations, the signal may be a portion of the payload 710-b advanced in time, another signal (for example, weighted overlap and add signal), or a combination thereof. The UE 115 may determine to adjust a starting time of a transmission of the random access payload 710-b (for example, a DMRS 725-b) by applying a fixed timing advance equal to a duration $T_X$. The duration $T_X$ may be less than or equal to the duration $T_G$, such that a portion of the random access payload 710-b is transmitted in the duration $T_G$. The UE 115 may determine the duration $T_X$ based on the duration $T_G$, a sampling frequency, a numerology of the random access preamble 705-b, a numerology of the DMRS 725-b, or a combination thereof. In some examples, such as when the duration $T_X$ is less than the duration $T_G$, a difference between the duration $T_X$ and the duration $T_G$ may be compensated by a weighted overlap and add (WOLA) portion 740. The WOLA portion 740 may provide a window to apply a first weighting function to the random access preamble 705-*b* and a second weighting function to the random access payload 710-*b* to improve processing and reduce ISI, ICI, of the random access message 700-*b* for example.

The UE 115 may skip a transmission gap by setting a duration $T_g$=0. Skipping the transmission gap may lead to ISI between the random access preamble 705-*b* and a random access payload 710-*b*. A DMRS 725-*b* of the random access payload 710-*b* may absorb the ISI between the random access preamble 705-*b* and a random access payload 710-*b*. A base station 105 may determine not to process the DMRS 725-*b* contaminated by the ISI based on performing channel estimation using the random access preamble 705-*b*. The base station 105 may decode a PUSCH 730-*b* based on performing the channel estimation using the random access preamble 705-*b*. The random access payload 710-*b* may further include a guard time 735-*b* following the PUSCH 730-*b*.

In some examples, the random access preamble 705-*b* and the DMRS 725-*b* may employ different numerologies or transmission powers. The UE 115 may create or be configured with a lookup table for waveform samples of the random access preamble 705-*b* and the DMRS 725-*b*. The lookup table may be based on a deterministic mapping relationship between the random access preamble 705-*b* and the DMRS 725-*b*, or a semi-static mapping relationship between the random access preamble 705-*b* and the DMRS 725-*b*. The UE 115 may use the lookup table for waveform generation when transmitting the random access message 700-*b*, rather than generating a waveform dynamically. Using a lookup table may reduce a latency for a waveform synthesis by saving a radio frequency tuning gap between the random access preamble 705-*b* and the DMRS 725-*b* when the random access preamble 705-*b* and the DMRS 725-*b* employ different numerologies or transmission powers. The WOLA portion 740 may be applied to waveform samples of the random access preamble 705-*b* and the DMRS 725-*b* to reduce an intercarrier interference of the random access message 700-*b*.

Figure 8:
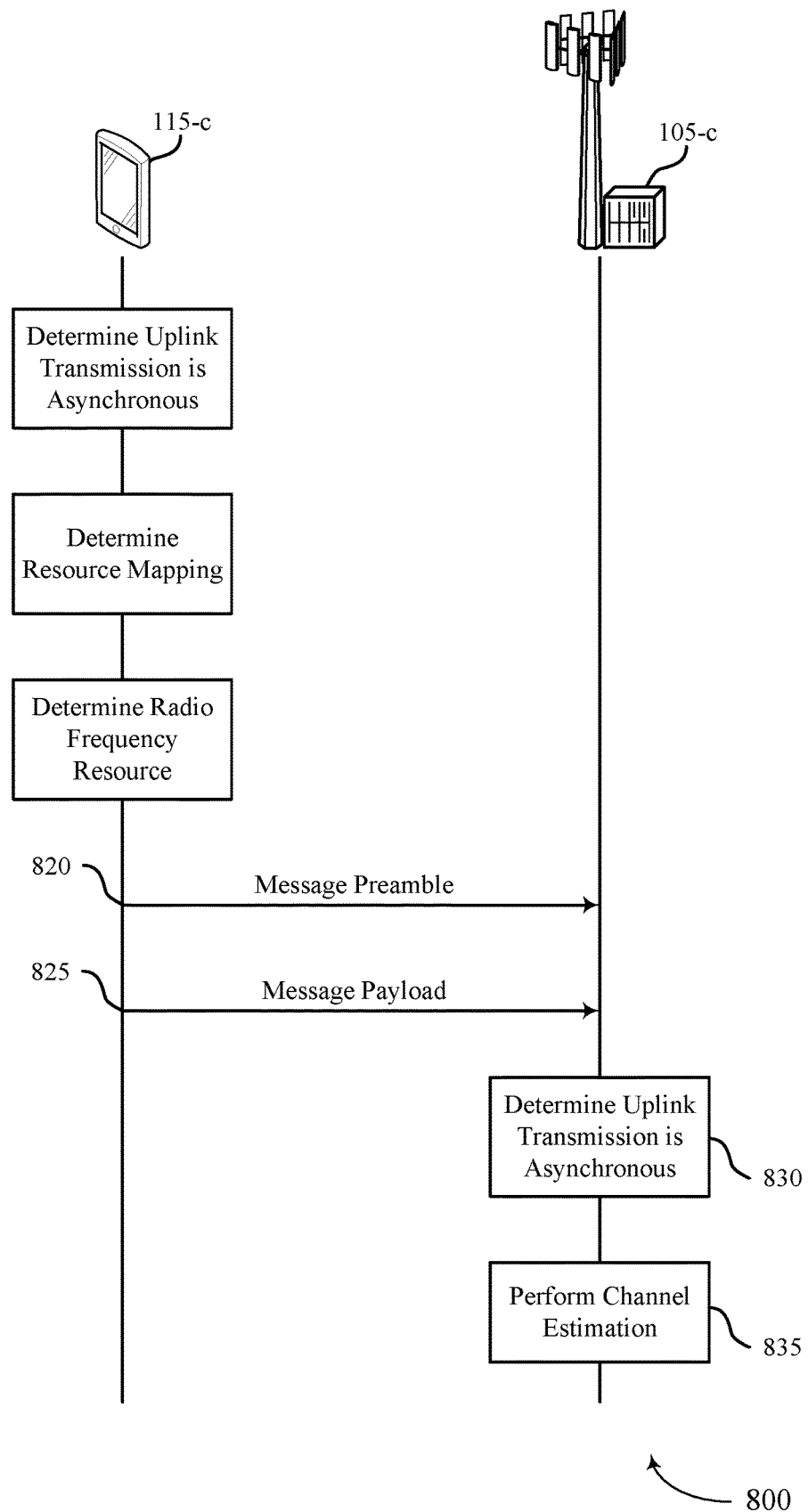
FIG. 8 illustrates an example of a process flow that supports resource mapping and waveform generation for uplink transmission in accordance with aspects of the present disclosure.

FIG. 8 illustrates an example of a process flow 800 that supports resource mapping and waveform generation for uplink transmission in accordance with aspects of the present disclosure. In some examples, process flow 800 may implement aspects of wireless communications system 100 or wireless communications system 200. Further, process flow 800 may be implemented by a UE 115-*c* and a base station 105-*c*, which may be examples of a UE 115 and a base station 105 described with reference to FIGS. 1 and 2. In the following description of the process flow 800, the operations performed by base station 105-*c* and UE 115-*c* may be performed in different orders or at different times. Certain operations may also be left out of the process flow 800, or other operations may be added to the process flow 800. While base station 105-*c* and UE 115-*c* are shown performing a number of the operations of process flow 800, any wireless device may perform the operations shown or described.

At 805, the UE 115-*c* may determine that an uplink transmission is asynchronous. In some examples, the UE 115-*c* may determine that the uplink transmission may include asynchronous, uplink random access message. In some examples, the uplink transmission may be a random access channel uplink transmission (for example, a two-step random access channel uplink transmission, a four-step random access channel uplink transmission). The asynchronous, uplink random access message may include a preamble and a payload. The UE 115-*c* may determine the uplink transmission is asynchronous based on identifying insufficient timing information (for example, outdated timing information) or absent timing information for the asynchronous uplink transmission. In some examples, a time alignment timer of the UE 115-*c* may stop (for example, expire), which may cause an uplink transmission to be asynchronous. In some examples, the UE 115-*c* may determine the that the uplink transmission is asynchronous based on determining the UE 115-*c* is in an RRC state, where the RRC state may be an RRC idle state, an RRC inactive state, or an RRC connected state. For example, when the UE 115-*c* is in an RRC idle state or an RRC inactive state, the UE 115-*c* may determine that the uplink transmission is asynchronous.

In some examples, the UE 115-*c* may determine that a second uplink transmission is synchronous. The second uplink transmission, which may be a random access channel uplink transmission, may include a second preamble and a second payload. In some examples, the preamble may be a shared preamble, and the second payload may be associated with both the preamble and the second preamble. In some examples, the UE 115-*c* may determine that the second uplink transmission is synchronous based on stored uplink timing information associated with the second uplink transmission.

At 810, the UE 115-*c* may determine a mapping for resources of the preamble and resources of the payload. The UE 115-*c* may determine the mapping based on determining that the uplink transmission includes an asynchronous, uplink random access message. In some examples, the UE 115-*c* may dynamically determine the resource mapping between the preamble and the payload of the asynchronous, uplink random access message. In other cases, the UE 115-*c* may store one or more static or semi-static resource mappings between the preamble and the payload of the asynchronous, uplink random access message. In some examples, the mapping associated with the asynchronous, uplink random access message may different than a mapping associated with synchronous uplink transmissions. For example, the UE 115-*c* may constrain a time and frequency resource mapping of the asynchronous, uplink random access message compared to a time and frequency resource mapping of synchronous uplink transmissions.

In some examples, the time and frequency resource mapping of the asynchronous, uplink random access message may be configured by the network, and the UE 115-*c* may identify the time and frequency resource mapping based on decoding SI. Additionally or alternatively, the time and frequency resource mapping of the asynchronous, uplink random access message may be preconfigured at the UE 115-*c* as part of configuration rules for a random access channel procedure (for example, a two- or four-step RACH procedure).

At 815, the UE 115-*c* may determine a first radio frequency resource for transmitting the preamble and a second radio frequency resource for transmitting the payload based on the mapping. In some examples, the second radio frequency resource may partially or entirely overlap with the first radio frequency resource of the asynchronous, uplink random access message. In some examples, the second radio frequency resource may occupy a portion of the first radio frequency resource of the asynchronous, uplink random access message. In some examples, the second radio frequency resource may be the same as the first radio frequency resource of the asynchronous, uplink random access message. In some examples, the UE 115-c may determine a third radio frequency resource for transmitting the second preamble and a fourth radio frequency resource for transmitting the payload based on the mapping. In some examples, the fourth radio frequency resource may at least partially overlap with the first radio frequency resource and the third radio frequency resource.

At 820, the UE 115-c may transmit the preamble over the first radio frequency resource, and the base station 105-c may receive the preamble. In some examples, the preamble may include a guard time, which may span a first duration. In some examples, the UE 115-c may include a transmission gap between transmitting the preamble and transmitting the payload in which transmission is paused. This pause may allow for completion of a transmission of the preamble with sufficient time to avoid interference with a subsequent transmission of the payload. The transmission gap may include the guard time, or may follow the guard time and span a second duration. In some examples, the UE 115-c may transmit the second preamble over the third radio frequency resource, and the base station 105-c may receive the second preamble.

At 825, the UE 115-c may transmit the payload over the second radio frequency resource, and the base station 105-c may receive the payload. In some examples, the payload may include a DMRS, a PUSCH, a guard time, or a combination thereof. In some examples, pausing uplink transmissions during the guard time of the preamble or the transmission gap between the preamble and the payload may result in a phase discontinuity between the preamble and the payload. In some examples, the UE 115-c may transmit the second payload over the fourth radio frequency resource, and the base station 105-c may receive the second payload.

At 830, the base station 105-c may determine that the uplink transmission is asynchronous based on receiving the preamble and the payload in a random access message. In some examples, the base station 105-c may determine the mapping for resources of the preamble and resources of the payload based on receiving the preamble and the payload. In some examples, the base station 105-c may determine the first radio frequency resource of the preamble and the second radio frequency resource of the payload.

At 835, the base station 105-c may perform channel estimation for the payload. The base station 105-c may perform the channel estimation using the preamble based on determining the uplink transmission is asynchronous. In some examples, the base station 105-c may determine not to process the DMRS of the payload based on performing channel estimation using the preamble. In some examples, the phase discontinuity resulting from pausing the uplink transmission during the guard time may degrade a quality of the channel estimation and a performance of a payload decoding. In some examples, the base station 105-c may perform additional waveform processing on the DMRS to avoid or mitigate the effects of the phase discontinuity.

Figure 9:
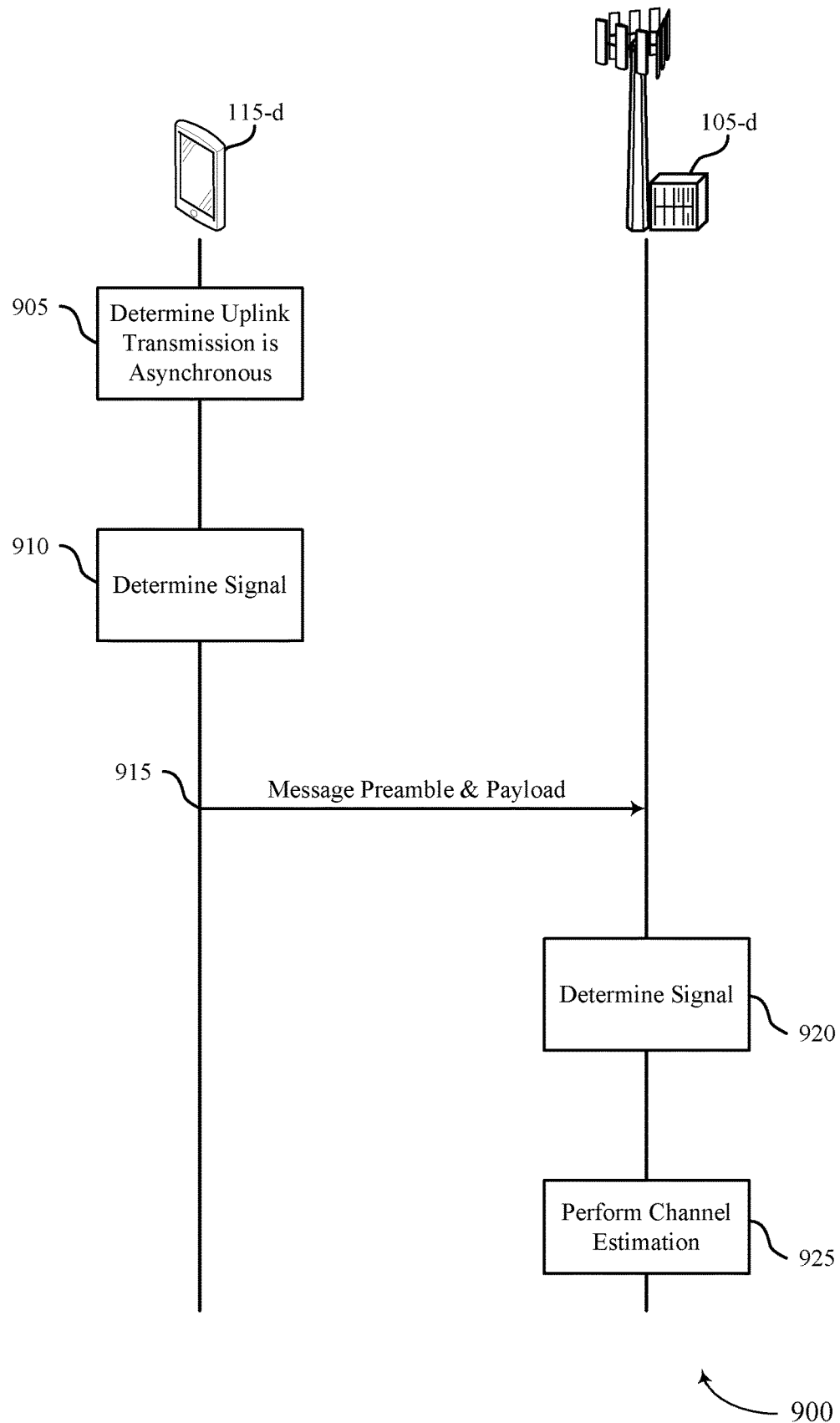
FIG. 9 illustrates an example of a process flow that supports resource mapping and waveform generation for uplink transmission in accordance with aspects of the present disclosure.

FIG. 9 illustrates an example of a process flow 900 that supports resource mapping and waveform generation for uplink transmission in accordance with aspects of the present disclosure. In some examples, process flow 900 may implement aspects of wireless communications system 100 or wireless communications system 200. Further, process flow 900 may be implemented by a UE 115-d and a base station 105-d, which may be examples of a UE 115 and a base station 105 described with reference to FIGS. 1 and 2. In the following description of the process flow 900, the operations performed by base station 105-d and UE 115-d may be performed in different orders or at different times. Certain operations may also be left out of the process flow 900, or other operations may be added to the process flow 900. While base station 105-d and UE 115-d are shown performing a number of the operations of process flow 900, any wireless device may perform the operations shown.

At 905, the UE 115-d may determine that an uplink transmission is asynchronous. In some examples, the UE 115-d may determine that the uplink transmission may include asynchronous, uplink random access message. In some examples, the uplink transmission may be a random access channel uplink transmission (for example, a two-step random access channel uplink transmission, a four-step random access channel uplink transmission). The uplink transmission may include a preamble and a payload. The UE 115-d may determine the uplink transmission is asynchronous based on identifying insufficient timing information (for example, outdated timing information) or absent timing information for the asynchronous uplink transmission. In some examples, a time alignment timer of the UE 115-d may stop (for example, expire), which may cause an uplink transmission to be asynchronous. In some examples, the UE 115-d may determine the that the uplink transmission is asynchronous based on determining the UE 115-d is in an RRC state, where the RRC state may be an RRC idle state, an RRC inactive state, or an RRC connected state. For example, when the UE 115-d is in an RRC idle state or an RRC inactive state, the UE 115-d may determine that the uplink transmission is asynchronous.

In a preamble that includes a guard time, uplink transmissions may be paused for a duration $T_G$ corresponding to a duration of the guard time. Pausing the uplink transmissions may result in a phase discontinuity between the preamble and a payload. In some examples, such as in an asynchronous, uplink random access message, this phase discontinuity may degrade a quality of a channel estimation and a performance of a payload decoding.

In some examples, the UE 115-d may determine a waveform configuration of the uplink transmission based on determining the uplink transmission is an asynchronous, uplink random access message. The waveform configuration may be a static configuration stored by the UE 115-d, such as in a lookup table.

At 910, the UE 115-d may determine a signal to transmit during the guard time associated with the preamble. The UE 115-d may determine the signal based on determining the uplink transmission includes an asynchronous, uplink random access message. In some examples, the UE 115-d may determine to cyclically extend a waveform of the preamble for at least a portion of the duration of the guard time, rather than pausing uplink transmission, to avoid or mitigate a phase discontinuity between the preamble and the payload. In some examples, a cyclic extension of the preamble may include a cyclic postfix of the preamble. The UE 115-d may cyclically extend the waveform of the preamble by a duration $T_G$, which corresponds to a duration of the guard time of the preamble. Additionally or alternatively, the UE 115-d may skip a transmission gap by setting a duration $T_g$=0. Skipping the transmission gap may lead to ISI between the preamble and the payload.

In some examples, the preamble and the payload may employ different numerologies or transmission powers. The UE 115-d may create or be configured with a lookup table for waveform samples of the preamble and the payload. The lookup table may be based on a deterministic mapping relationship between the preamble and the payload, or a semi-static mapping relationship between the preamble and the payload. The UE 115-d may use the lookup table for waveform generation based on determining the uplink transmission is asynchronous, rather than generating the waveform dynamically. Using a lookup table may reduce a latency for a waveform synthesis by saving a radio frequency tuning gap between the preamble and the payload in instances when the preamble and the payload employ different numerologies or transmission powers.

At 915, the UE 115-d may transmit the preamble and the payload. The UE 115-d may transmit the preamble and the payload as a continuous transmission, and the base station 105-d may receive the transmission. The preamble may include the signal in the duration $T_G$ corresponding to the duration of the guard time. In some examples, the signal may include the cyclic extension of the preamble.

In some examples, the UE 115-d may determine to adjust a starting time of a transmission of the payload by applying a fixed timing advance equal to a duration $T_X$. The duration $T_X$ may be less than or equal to the duration $T_G$, such that a portion of the payload is transmitted in the duration $T_G$. The UE 115-d may determine the duration $T_X$ based on the duration $T_G$, a sampling frequency, a numerology of the preamble, a numerology of the payload, or a combination thereof. In some examples, such as when the duration $T_X$ is less than the duration $T_G$, a difference between the duration $T_X$ and the duration $T_G$ may be compensated by a WOLA portion. The WOLA portion may provide a window to apply a first weighting function to the preamble and a second weighting function to the payload to improve processing and reduce ISI, ICI, for example, of the asynchronous, uplink random access message.

In some examples, the UE 115-d may determine to skip a transmission gap by setting a duration $T_g=0$. Skipping the transmission gap may lead to ISI between the preamble and the payload. A DMRS of the payload may absorb the ISI between the preamble and the payload.

At 920, the base station 105-d may determine the signal received during the guard time of the preamble. In some examples, the signal may comprise the cyclic extension, the cyclic postfix of the preamble, the WOLA portion, a portion of the payload based on the timing advance, or a combination thereof. In some examples, the base station 105-d may determine the waveform configuration of the asynchronous, uplink random access message, which in some examples may be stored in a lookup table.

At 925, the base station 105-d may perform channel estimation. The base station 105-d may perform the channel estimation using the preamble based on determining the uplink transmission includes an asynchronous, uplink random access message. In some examples, the phase discontinuity resulting from pausing uplink transmission during the guard time may degrade a quality of the channel estimation and a performance of a PUSCH decoding. In some examples, the base station 105-d may perform additional waveform processing on the DMRS of the payload to avoid or mitigate the effects of the phase discontinuity. In some examples, the base station 105-d may determine not to process the DMRS contaminated by the ISI based on performing channel estimation using the preamble. The base station 105-d may decode the PUSCH based on performing the channel estimation using the preamble. The payload may further include a guard time following the PUSCH.

Figure 10:
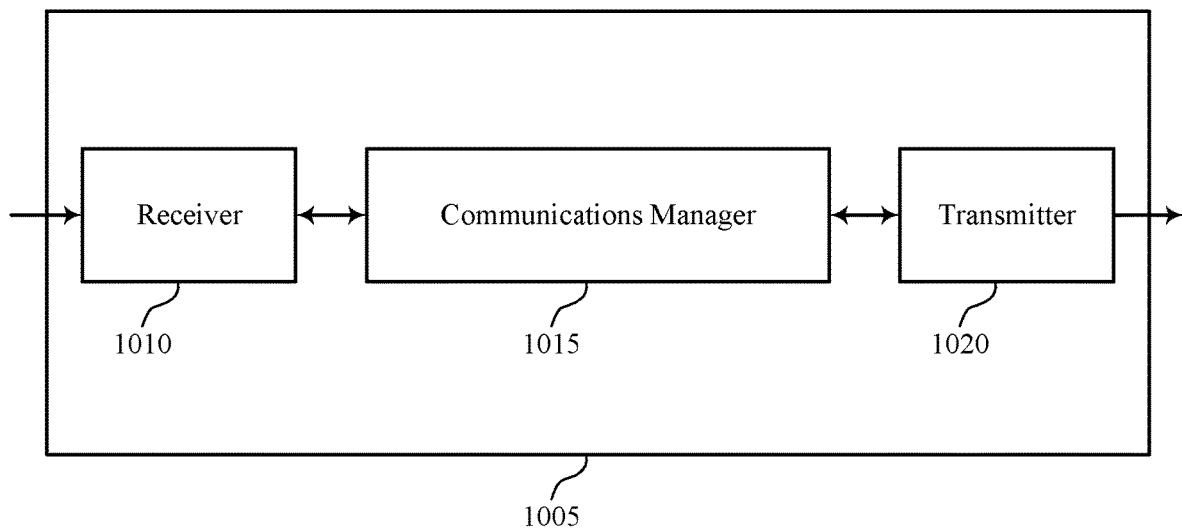
FIGS. 10 and 11 show block diagrams of devices that support resource mapping and waveform generation for uplink transmission in accordance with aspects of the present disclosure.

FIG. 10 shows a block diagram of a device 1005 that supports resource mapping and waveform generation for uplink transmission in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (for example, via one or more buses).

The receiver 1010 may receive information such as packets, user data, or control information associated with various information channels (for example, control channels, data channels, and information related to resource mapping and waveform generation for uplink transmission). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may determine that a random access channel uplink transmission is asynchronous, the random access channel uplink transmission including a preamble and a payload, determine a mapping for resources of the preamble and resources of the payload based on determining that the random access channel uplink transmission is asynchronous, determine a first radio frequency resource for transmitting the preamble and a second radio frequency resource for transmitting the payload based on the mapping, and transmit the preamble over the first radio frequency resource and the payload over the second radio frequency resource.

The communications manager 1015 may also determine that a random access channel uplink transmission is asynchronous, the random access channel uplink transmission including a preamble and a payload, determine a signal to transmit during a guard time associated with the preamble based on determining that the random access channel uplink transmission is asynchronous, and transmit the preamble, the signal during the guard time associated with the preamble, and the payload as a continuous transmission.

The communications manager 1015 as described herein may be implemented to realize one or more potential advantages. One implementation may allow the device 1005 to save power and increase battery life by communicating with a base station 105 (as shown in FIG. 1) more efficiently. For example, the device 1005 may efficiently communicate with a base station 105 via asynchronous uplink transmissions, as the device 1005 may be able to map communication resources as indicated by the base station 105, which may allow the base station 105 to use a preamble to perform channel estimation associated with a payload. The communications manager 1015 may be an example of aspects of the communications manager 1310 described herein.

The communications manager 1015, or its sub-components, may be implemented in hardware, code (for example, software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described in the present disclosure.

The communications manager 1015, or its sub-components, may be physically located at different locations, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
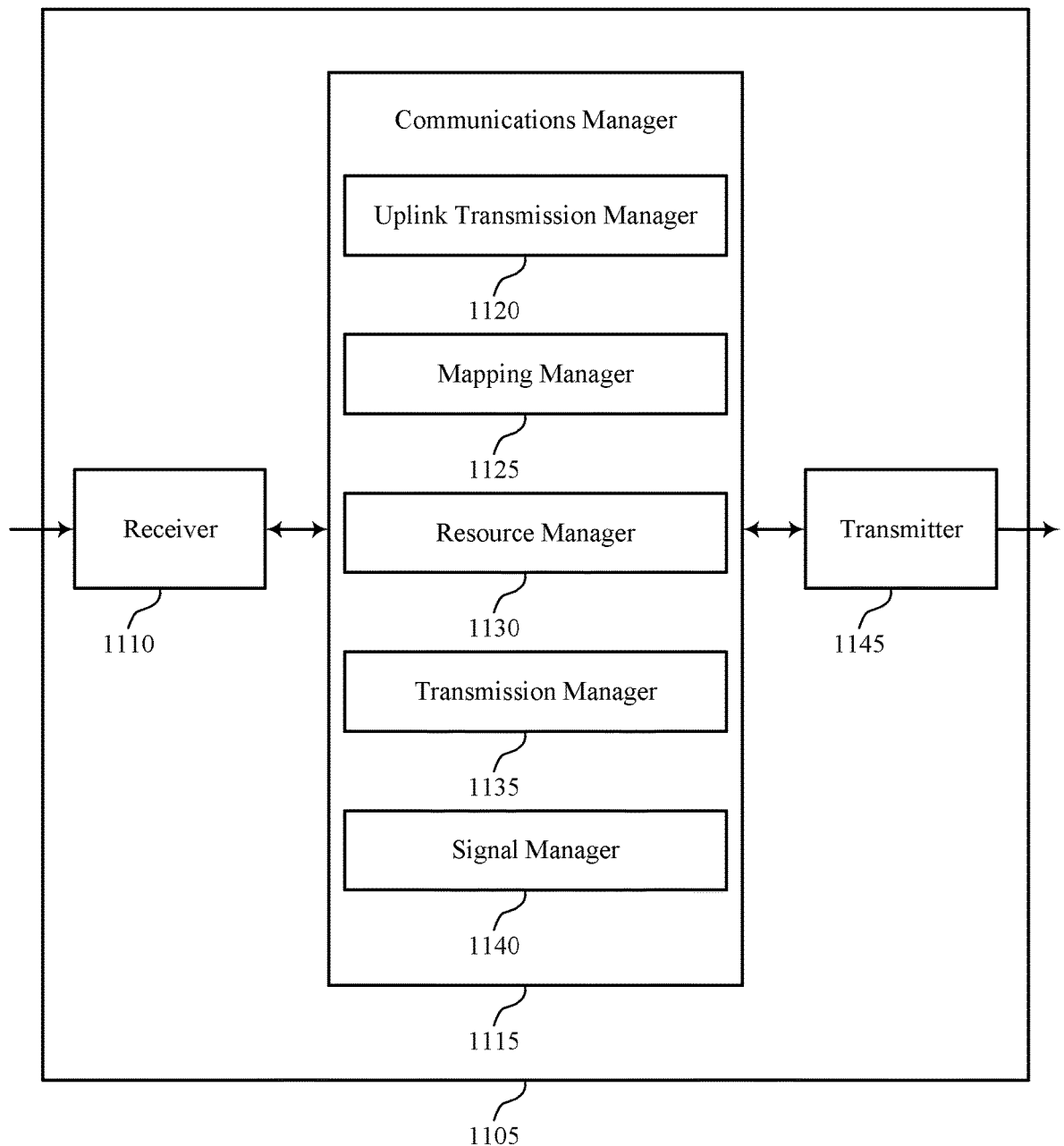

FIG. 11 shows a block diagram of a device 1105 that supports resource mapping and waveform generation for uplink transmission in accordance with aspects of the present disclosure. The device 1105 may be an example of aspects of a device 1005, or a UE 115 as described herein. The device 1105 may include a receiver 1110, a communications manager 1115, and a transmitter 1145. The device 1105 may be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to resource mapping and waveform generation for uplink transmission). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include an uplink transmission manager 1120, a mapping manager 1125, a resource manager 1130, a transmission manager 1135, and a signal manager 1140. The communications manager 1115 may be an example of aspects of the communications manager 1310 described herein.

The uplink transmission manager 1120 may determine that a random access channel uplink transmission is asynchronous, the random access channel uplink transmission including a preamble and a payload.

The mapping manager 1125 may determine a mapping for resources of the preamble and resources of the payload based on determining that the random access channel uplink transmission is asynchronous.

The resource manager 1130 may determine a first radio frequency resource for transmitting the preamble and a second radio frequency resource for transmitting the payload based on the mapping.

The signal manager 1140 may determine a signal to transmit during a guard time associated with the preamble based on determining that the random access channel uplink transmission is asynchronous.

The transmission manager 1135 may transmit the preamble over the first radio frequency resource and the payload over the second radio frequency resource. The transmission manager 1135 may transmit the preamble, the signal during the guard time associated with the preamble, and the payload as a continuous transmission.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
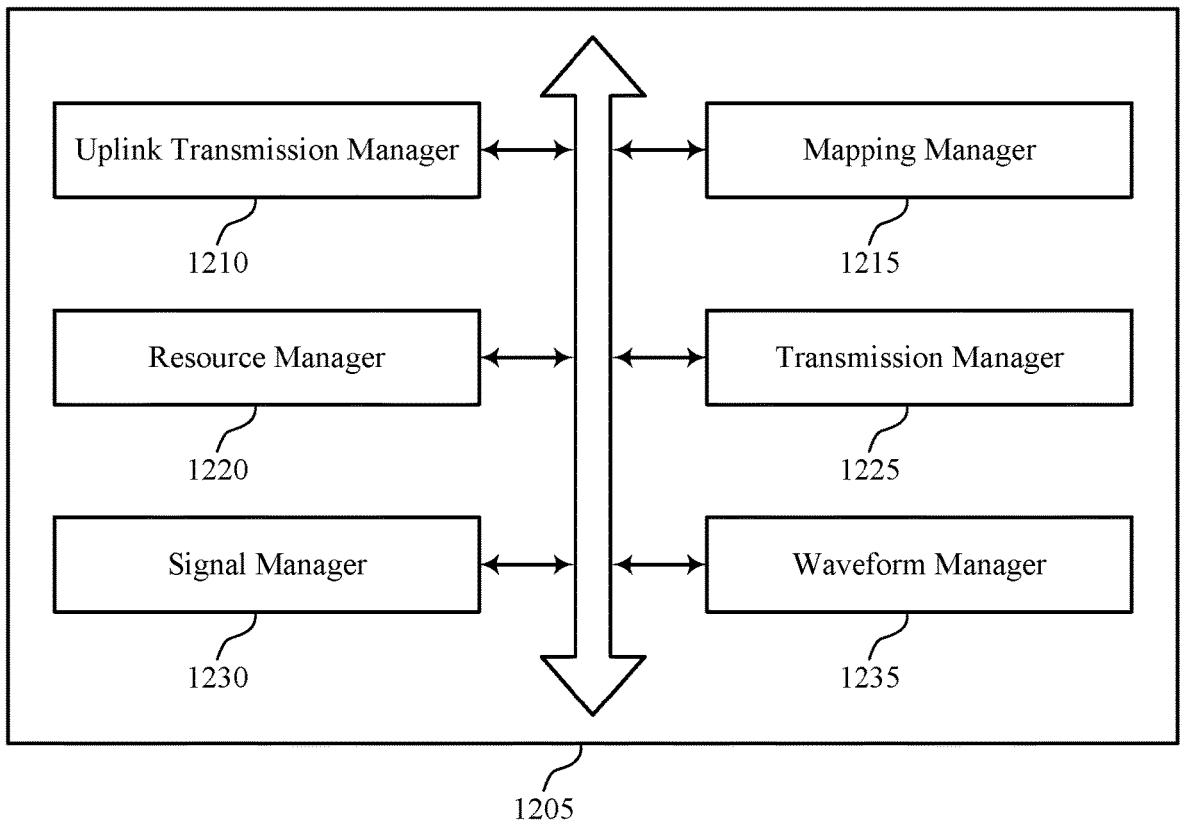
FIG. 12 shows a block diagram of a communications manager that supports resource mapping and waveform generation for uplink transmission in accordance with aspects of the present disclosure.

FIG. 12 shows a block diagram of a communications manager 1205 that supports resource mapping and waveform generation for uplink transmission in accordance with aspects of the present disclosure. The communications manager 1205 may be an example of aspects of a communications manager 1015, a communications manager 1115, or a communications manager 1310 described herein. The communications manager 1205 may include an uplink transmission manager 1210, a mapping manager 1215, a resource manager 1220, a transmission manager 1225, a signal manager 1230, and a waveform manager 1235. Each of these modules may communicate, directly or indirectly, with one another (for example, via one or more buses).

The uplink transmission manager 1210 may determine that a random access channel uplink transmission is asynchronous, the random access channel uplink transmission including a preamble and a payload. In some examples, the uplink transmission manager 1210 may determine that a second random access channel uplink transmission is synchronous, the second random access channel uplink transmission including a second preamble and a second payload. In some examples, the uplink transmission manager 1210 may determine that the user equipment stores uplink timing information associated with the second random access channel uplink transmission, where determining that the second random access channel uplink transmission is synchronous is based on determining that the user equipment stores the uplink timing information associated with the second random access channel uplink transmission.

In some examples, the uplink transmission manager 1210 may determine that the user equipment is in a radio resource control idle state or a radio resource control inactive state, where determining that the random access channel uplink transmission is asynchronous is based on determining that the user equipment is in the radio resource control idle state or the radio resource control inactive state.

In some examples, the uplink transmission manager 1210 may determine that uplink timing information associated with the random access channel uplink transmission and stored by the user equipment is insufficient, where determining that the random access channel uplink transmission is asynchronous is based on determining that the uplink timing information is insufficient. In some examples, the uplink transmission manager 1210 may determine that a time alignment timer associated with the random access channel uplink transmission has expired (for example, stopped), where determining that the random access channel uplink transmission is asynchronous is based on determining that the time alignment timer has expired (for example, stopped). In some examples, the uplink transmission manager 1210 may determine that the user equipment does not store uplink timing information associated with the random access channel uplink transmission, where determining that the random access channel uplink transmission is asynchronous is based on determining that the user equipment does not store the uplink timing information associated with the random access channel uplink transmission.

In some examples, the second payload is associated with the preamble and the second preamble. In some examples, the preamble is configured to be used by a base station for channel estimation associated with the payload. In some examples, the random access channel uplink transmission includes a two-step random access channel uplink transmission. In some examples, the payload of the random access channel uplink transmission includes one or more of a demodulation reference signal, a physical uplink shared channel, or a guard time. In some examples, the preamble is configured to be used by a base station for channel estimation associated with the payload. In some examples, the payload of the random access channel uplink transmission includes one or more of a demodulation reference signal, a physical uplink shared channel, or a guard time.

The mapping manager 1215 may determine a mapping for resources of the preamble and resources of the payload based on determining that the random access channel uplink transmission is asynchronous. In some examples, the mapping associated with asynchronous uplink transmissions is different than a mapping associated with synchronous uplink transmissions. In some examples, the mapping manager 1215 may receive, from a base station, system information indicating a time-frequency resource mapping or a waveform generation or both of the random access uplink transmission, where determining the mapping may be based on receiving the system information The resource manager 1220 may determine a first radio frequency resource for transmitting the preamble and a second radio frequency resource for transmitting the payload based on the mapping. In some examples, the second radio frequency resource is the same as the first radio frequency resource. In some examples, the second radio frequency resource occupies a portion of the first radio frequency resource. In some examples, the second radio frequency resource partially overlaps with the first radio frequency resource.

The transmission manager 1225 may transmit the preamble over the first radio frequency resource and the payload over the second radio frequency resource. In some examples, the transmission manager 1225 may transmit the preamble, the signal during the guard time associated with the preamble, and the payload as a continuous transmission. In some examples, the transmission manager 1225 may transmit the second preamble over a third radio frequency resource and the second payload over a fourth radio frequency resource that at least partially overlaps with the first radio frequency resource and the third radio frequency resource. In some examples, the transmission manager 1225 may set a duration of a transmission gap associated with the random access channel uplink transmission to zero, where transmitting the preamble, the signal, and the payload is based on setting the duration to zero. In some examples, the transmission manager 1225 may skip the guard time of the preamble by transmitting the signal during the guard time.

The signal manager 1230 may determine a signal to transmit during a guard time associated with the preamble based on determining that the random access channel uplink transmission is asynchronous. In some examples, the signal manager 1230 may receiving, from a base station, system information indicating a time-frequency resource mapping or a waveform generation or both of the random access uplink transmission, where determining the signal may be based on receiving the system information. In some examples, the signal manager 1230 may determine a semi-static timing advance adjustment for the payload. In some examples, the signal manager 1230 may advance a transmission time of the payload by a value of the timing advance adjustment, where transmitting the preamble, the signal, and the payload is based on applying the semi-static timing advance adjustment to the transmission time of the payload. In some examples, the signal manager 1230 may generate a WOLA to be transmitted during a third duration between the preamble and the payload, where the signal includes the WOLA and at least a portion of the payload. In some examples, a duration of the timing advance is the same as a duration of the guard time associated with the preamble. In some examples, the signal includes the payload. In some examples, at least a portion of the signal includes at least a portion of the payload. In some examples, the signal manager 1230 may skip the guard time of the preamble by transmitting the signal during the guard time, where the signal includes one or more of a cyclically extended preamble signal, a cyclically extended payload signal, at least a portion of the payload, or a weighted overlap and add (WOLA) signal The waveform manager 1235 may determine a waveform configuration of the random access channel uplink transmission based on determining that the random access channel uplink transmission is asynchronous, where determining the signal is based on determining the waveform configuration of the random access channel uplink transmission. In some examples, the waveform manager 1235 may extend, cyclically, a waveform of the preamble for at least a portion of a duration of the guard time associated with the preamble. In some examples, the extended waveform of the preamble includes a cyclic postfix of the preamble. In some examples, the waveform manager 1235 may extend, cyclically, a waveform of the payload for at least a portion of a duration of the guard time associated with the preamble. In some examples, the extended waveform of the payload includes a cyclic prefix of the payload. In some examples, the waveform configuration is a static configuration stored by the user equipment.

Figure 13:
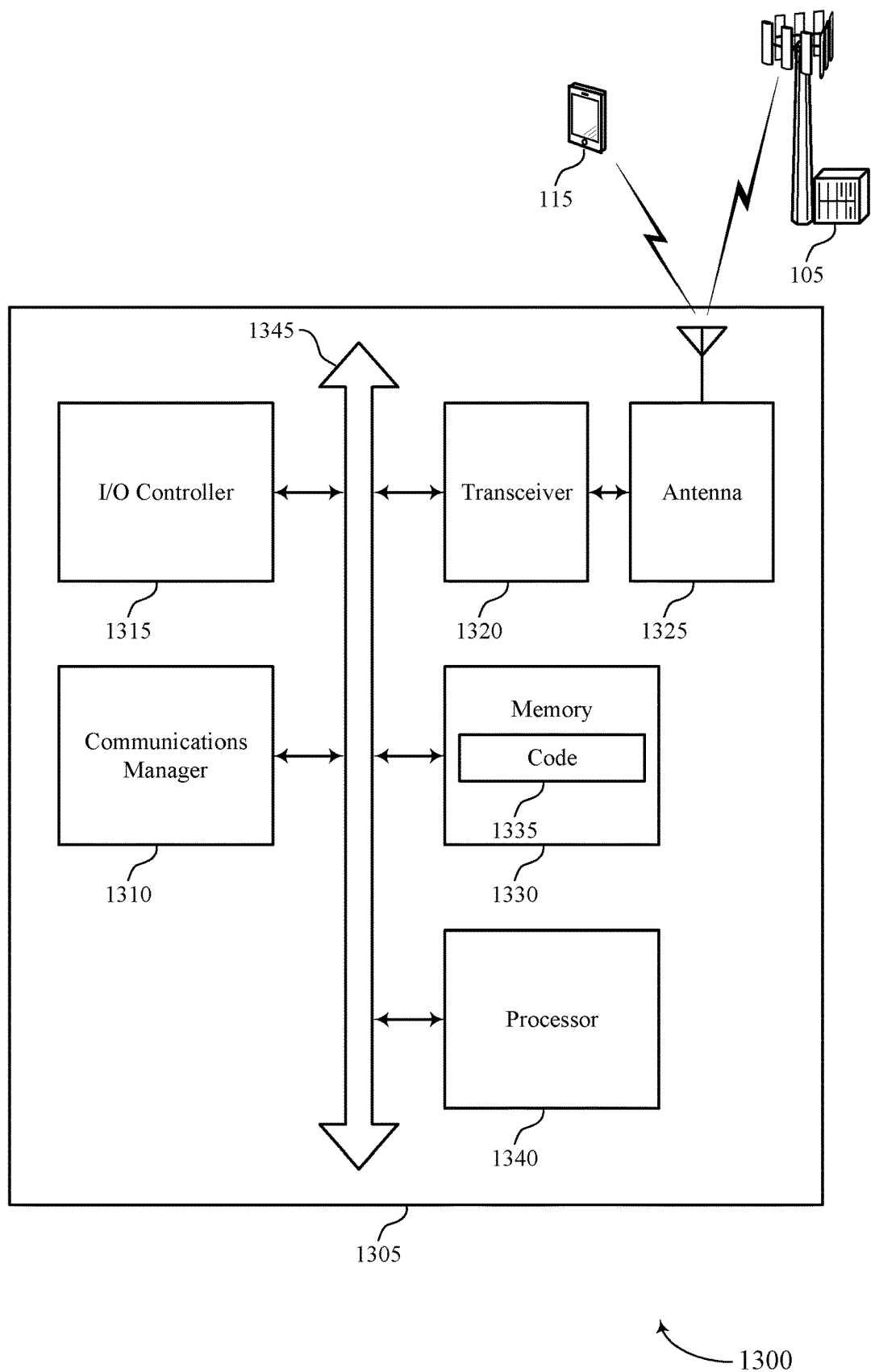
FIG. 13 shows a diagram of a system including a device that supports resource mapping and waveform generation for uplink transmission in accordance with aspects of the present disclosure.

FIG. 13 shows a diagram of a system 1300 including a device 1305 that supports resource mapping and waveform generation for uplink transmission in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (for example, bus 1345).

The communications manager 1310 may determine that a random access channel uplink transmission is asynchronous, the random access channel uplink transmission including a preamble and a payload, determine a mapping for resources of the preamble and resources of the payload based on determining that the random access channel uplink transmission is asynchronous, determine a first radio frequency resource for transmitting the preamble and a second radio frequency resource for transmitting the payload based on the mapping, and transmit the preamble over the first radio frequency resource and the payload over the second radio frequency resource. The communications manager 1310 may also determine that a random access channel uplink transmission is asynchronous, the random access channel uplink transmission including a preamble and a payload, determine a signal to transmit during a guard time associated with the preamble based on determining that the random access channel uplink transmission is asynchronous, and transmit the preamble, the signal during the guard time associated with the preamble, and the payload as a continuous transmission.

The I/O controller 1315 may manage input and output signals for the device 1305. The I/O controller 1315 may also manage peripherals not integrated into the device 1305. In some examples, the I/O controller 1315 may represent a physical connection or port to an external peripheral. In some examples, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some examples, the I/O controller 1315 may be implemented as part of a processor. In some examples, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some examples, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some examples, the memory 1330 may contain, among other things, a basic input/output system (BIOS) which may control basic hardware or software operation such as the interaction with peripheral components or devices.

The processor 1340 may include an intelligent hardware device (for example, a general-purpose processor, a DSP, a central processing unit (CPU), a microcontroller, an ASIC, an FPGA, a PLD, a discrete gate or transistor logic component, a discrete hardware component, or any combination thereof). In some examples, the processor 1340 may be configured to operate a memory array using a memory controller. In other cases, a memory controller may be integrated into the processor 1340. The processor 1340 may be configured to execute computer-readable instructions stored in a memory (for example, the memory 1330) to cause the device 1305 to perform various functions (for example, functions or tasks supporting resource mapping and waveform generation for uplink transmission).

The processor 1340 of the device 1305 (for example, controlling the receiver 1010, the transmitter 1020, or the transceiver 1320) may reduce power consumption and increase communications efficiency based on configuring communication resources of the preamble and the payload of the asynchronous uplink transmission. In some examples, the processor 1340 of the device 1305 may reconfigure parameters for implementing a random access channel procedure. For example, the processor 1340 of the device 1305 may turn on one or more processing units for configuring uplink resources, increase a processing clock, or a similar mechanism within the device 1305. As such, when subsequent asynchronous uplink transmissions are scheduled, the processor 1340 may be ready to respond more efficiently through the reduction of a ramp up in processing power. The improvements in power saving and uplink transmission efficiency may further increase battery life at the device 1305.

The code 1335 may include instructions to implement aspects of the present disclosure, including instructions to support wireless communications. The code 1335 may be stored in a non-transitory computer-readable medium such as system memory or other type of memory. In some examples, the code 1335 may not be directly executable by the processor 1340 but may cause a computer (for example, when compiled and executed) to perform functions described herein.

Figure 14:
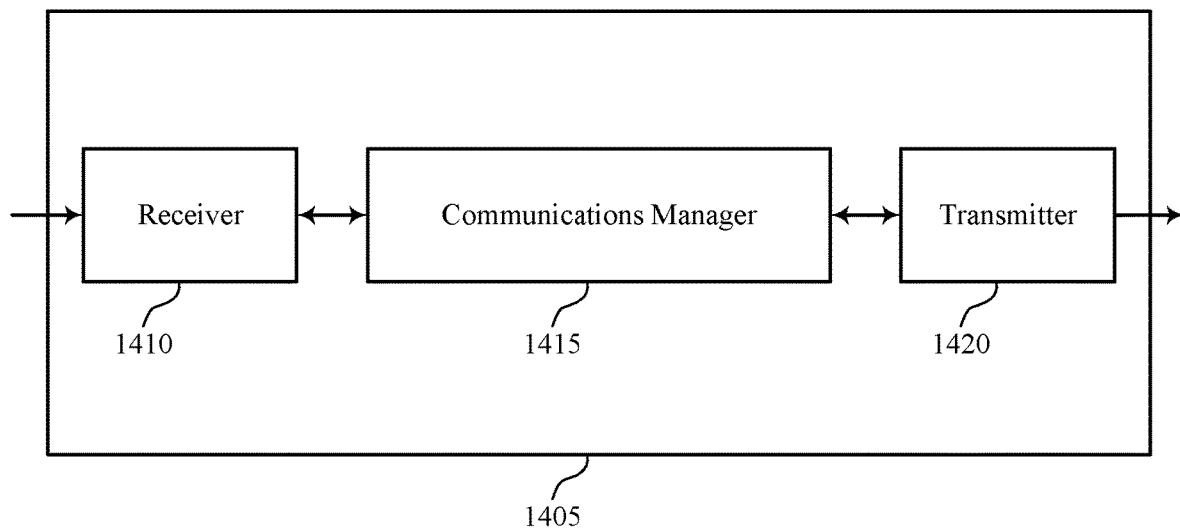
FIGS. 14 and 15 show block diagrams of devices that support resource mapping and waveform generation for uplink transmission in accordance with aspects of the present disclosure.

FIG. 14 shows a block diagram of a device 1405 that supports resource mapping and waveform generation for uplink transmission in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (for example, via one or more buses).

The receiver 1410 may receive information such as packets, user data, or control information associated with various information channels (for example, control channels, data channels, and information related to resource mapping and waveform generation for uplink transmission). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may receive a random access channel uplink transmission that includes a preamble and a payload, determine that the random access channel uplink transmission is asynchronous based on receiving the random access channel uplink transmission, and perform channel estimation for the payload using the preamble based on the random access channel uplink transmission being asynchronous.

The communications manager 1415 may also receive a random access channel uplink transmission that includes a preamble and a payload, determine that a signal is received during a guard time of the preamble based on receiving the random access channel uplink transmission, and perform channel estimation for the payload using the preamble based on determining that the signal is received during the guard time of the preamble.

The communications manager 1415 as described herein may be implemented to realize one or more potential advantages. One implementation may allow the device 1405 to save power by communicating with a UE 115 (as shown in FIG. 1) more efficiently. For example, the device 1405 may improve reliability in communications with a UE 115, as the device 1405 may be able to perform channel estimation for a payload based on a preamble from the UE 115. Additionally, the device 1405 may be able to identify the resource mapping implemented at the UE 115 and adjust communications components accordingly. The communications manager 1415 may be an example of aspects of the communications manager 1710 described herein.

The communications manager 1415, or its sub-components, may be implemented in hardware, code (for example, software or firmware) executed by a processor, or any combination thereof. If implemented in code executed by a processor, the functions of the communications manager 1415, or its sub-components may be executed by a general-purpose processor, a DSP, an ASIC, an FPGA or other PLD, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
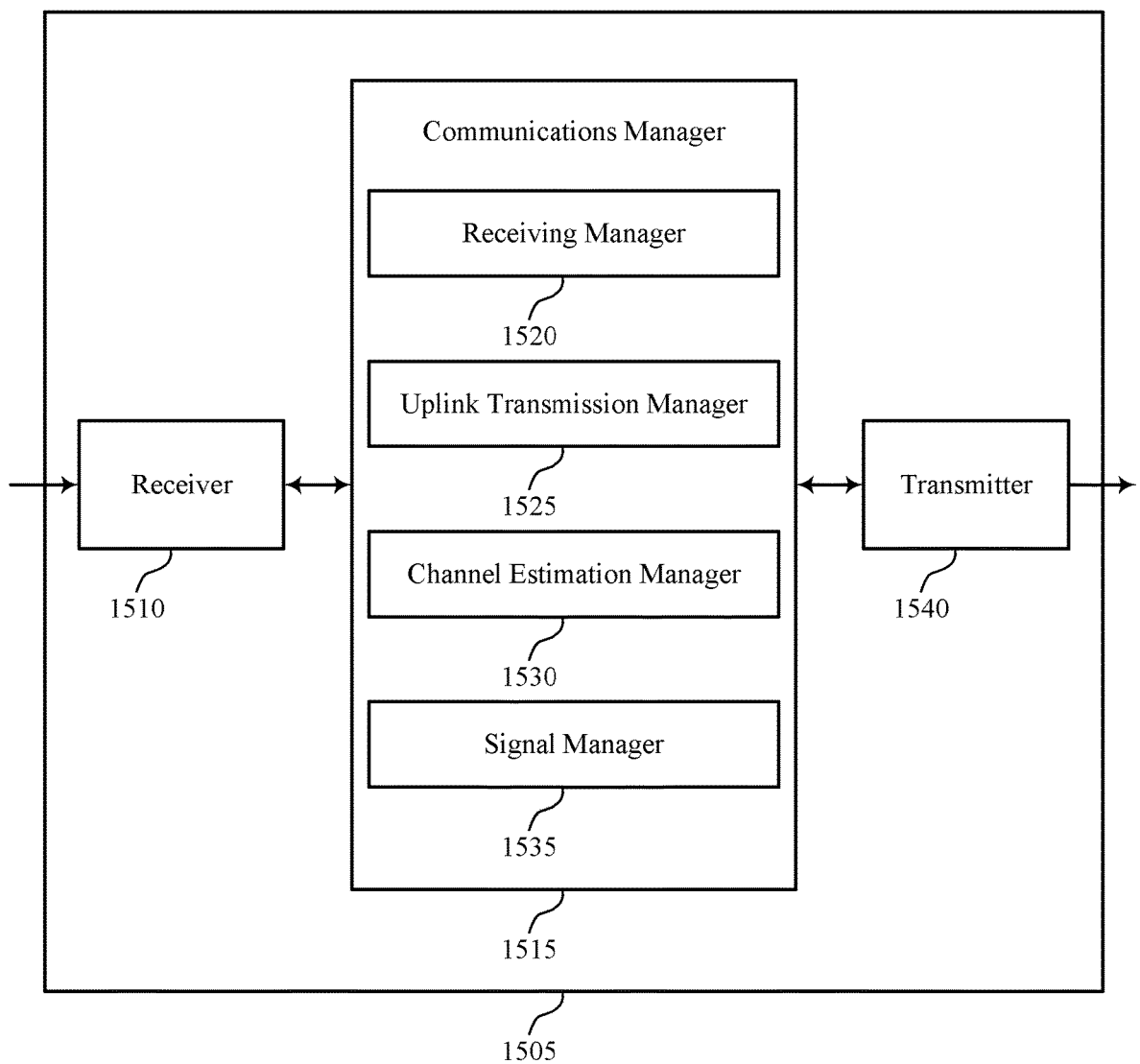

FIG. 15 shows a block diagram of a device 1505 that supports resource mapping and waveform generation for uplink transmission in accordance with aspects of the present disclosure. The device 1505 may be an example of aspects of a device 1405, or a base station 105 as described herein. The device 1505 may include a receiver 1510, a communications manager 1515, and a transmitter 1540. The device 1505 may also include a processor. Each of these components may be in communication with one another (for example, via one or more buses).

The receiver 1510 may receive information such as packets, user data, or control information associated with various information channels (for example, control channels, data channels, and information related to resource mapping and waveform generation for uplink transmission). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a receiving manager 1520, an uplink transmission manager 1525, a channel estimation manager 1530, and a signal manager 1535. The communications manager 1515 may be an example of aspects of the communications manager 1710 described herein.

The receiving manager 1520 may receive a random access channel uplink transmission that includes a preamble and a payload.

The uplink transmission manager 1525 may determine that the random access channel uplink transmission is asynchronous based on receiving the random access channel uplink transmission. The uplink transmission manager 1525 may receive a random access channel uplink transmission that includes a preamble and a payload.

The channel estimation manager 1530 may perform channel estimation for the payload using the preamble based on the random access channel uplink transmission being asynchronous. The channel estimation manager 1530 may perform channel estimation for the payload using the preamble based on determining that the signal is received during the guard time of the preamble.

The signal manager 1535 may determine that a signal is received during a guard time of the preamble based on receiving the random access channel uplink transmission.

The transmitter 1540 may transmit signals generated by other components of the device 1505. In some examples, the transmitter 1540 may be collocated with a receiver 1510 in a transceiver module. For example, the transmitter 1540 may be an example of aspects of the transceiver 1720 described with reference to FIG. 17. The transmitter 1540 may utilize a single antenna or a set of antennas.

Figure 16:
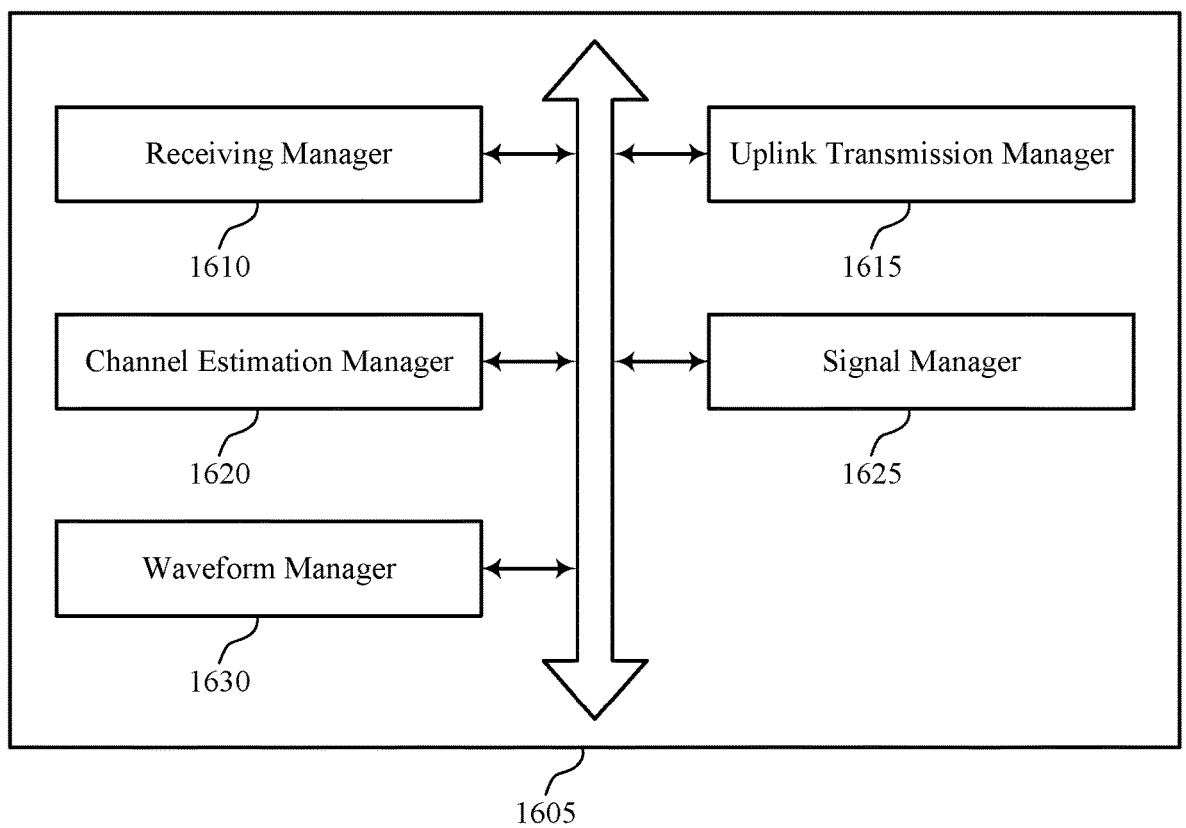
FIG. 16 shows a block diagram of a communications manager that supports resource mapping and waveform generation for uplink transmission in accordance with aspects of the present disclosure.

FIG. 16 shows a block diagram of a communications manager 1605 that supports resource mapping and waveform generation for uplink transmission in accordance with aspects of the present disclosure. The communications manager 1605 may be an example of aspects of a communications manager 1415, a communications manager 1515, or a communications manager 1710 described herein. The communications manager 1605 may include a receiving manager 1610, an uplink transmission manager 1615, a channel estimation manager 1620, a signal manager 1625, and a waveform manager 1630. Each of these modules may communicate, directly or indirectly, with one another (for example, via one or more buses).

The receiving manager 1610 may receive a random access channel uplink transmission that includes a preamble and a payload. In some examples, the payload of the random access channel uplink transmission includes one or more of a demodulation reference signal, a physical uplink shared channel, or a guard time.

The uplink transmission manager 1615 may determine that the random access channel uplink transmission is asynchronous based on receiving the random access channel uplink transmission. In some examples, receiving a random access channel uplink transmission that includes a preamble and a payload. In some examples, the uplink transmission manager may transmit, to a user equipment, a mapping of time and frequency resources for the random access channel uplink transmission and a waveform generation configuration for the random access channel uplink transmission, where performing the channel estimation may be based on transmitting the mapping.

In some examples, the uplink transmission manager 1615 may determine a mapping for resources of the preamble and resources of the payload based on determining that the random access channel uplink transmission is asynchronous, where performing the channel estimation is based on determining the mapping. In some examples, the uplink transmission manager 1615 may determine a first radio frequency resource of the preamble and a second radio frequency resource of the payload based on the receiving the random access channel uplink transmission, where performing the channel estimation is based on determining the first radio frequency resource and the second radio frequency resource.

In some examples, the uplink transmission manager 1615 may receive a second preamble of a second random access channel uplink transmission over a third radio frequency resource and a second payload of the second random access channel uplink transmission over a fourth radio frequency resource that at least partially overlaps with the first radio frequency resource and the third radio frequency resource.

In some examples, the uplink transmission manager 1615 may determine that the second random access channel uplink transmission is synchronous based on receiving the second random access channel uplink transmission. In some examples, the uplink transmission manager 1615 may determine that a user equipment is in a radio resource control idle state or a radio resource control inactive state, where determining that the random access channel uplink transmission is asynchronous is based on determining that the user equipment is in the radio resource control idle state or the radio resource control inactive state.

In some examples, the uplink transmission manager 1615 may determine that the random access channel uplink transmission is asynchronous based on receiving the random access channel uplink transmission, where performing the channel estimation is based on the random access channel uplink transmission being asynchronous. In some examples, the second radio frequency resource is the same as the first radio frequency resource. In some examples, the second radio frequency resource partially overlaps with the first radio frequency resource. In some examples, the second radio frequency resource occupies a portion of the first radio frequency resource. In some examples, the second payload is associated with the preamble and the second preamble. In some examples, the random access channel uplink transmission includes a two-step random access channel uplink transmission. In some examples, a mapping for resources of the preamble and resources of the payload associated with asynchronous uplink transmissions is different than a mapping associated with synchronous uplink transmissions. In some examples, the payload of the random access channel uplink transmission includes one or more of a demodulation reference signal, a physical uplink shared channel, or a guard time.

The channel estimation manager 1620 may perform channel estimation for the payload using the preamble based on the random access channel uplink transmission being asynchronous. In some examples, the channel estimation manager 1620 may transmit, to a user equipment, a mapping of time and frequency resources for the random access channel uplink transmission and a waveform generation configuration for the random access channel uplink transmission, where performing the channel estimation may be based on transmitting the mapping. In some examples, the channel estimation manager 1620 may perform channel estimation for the payload using the preamble based on determining that the signal is received during the guard time of the preamble. In some examples, the channel estimation manager 1620 may perform channel estimation for the second payload using at least a portion of the preamble and at least a portion of the second preamble based on the second random access channel uplink transmission being synchronous. In some examples, the channel estimation manager 1620 may ignore a demodulation reference signal portion of the payload. In some examples, the preamble is configured to be used for the channel estimation associated with the payload. In some examples, the preamble is configured to be used for the channel estimation associated with the payload.

The signal manager 1625 may determine that a signal is received during a guard time of the preamble based on receiving the random access channel uplink transmission. In some examples, the signal manager 1625 may receive the signal during the guard time of the preamble, where determining that the signal is received during the guard time of the preamble is based on receiving the signal during the guard time of the preamble. In some examples, the signal received during the guard time of the preamble includes a portion of the payload advanced in time. In some examples, the signal received during the guard time of the preamble includes at least a portion of a weighted overlap and add (WOLA) and at least a portion of the payload. In some examples, the random access channel uplink transmission includes a continuous transmission and does not include a transmission gap. In some examples, at least a portion of the signal includes at least a portion of the payload.

The waveform manager 1630 may determine a waveform configuration of the random access channel uplink transmission based on receiving the random access channel uplink transmission, where performing the channel estimation is based on determining the waveform configuration of the random access channel uplink transmission. In some examples, the waveform configuration is a static configuration. In some examples, the signal received during the guard time of the preamble includes a cyclic extension of a waveform of the preamble. In some examples, the cyclic extension of the preamble includes a cyclic postfix of the preamble.

Figure 17:
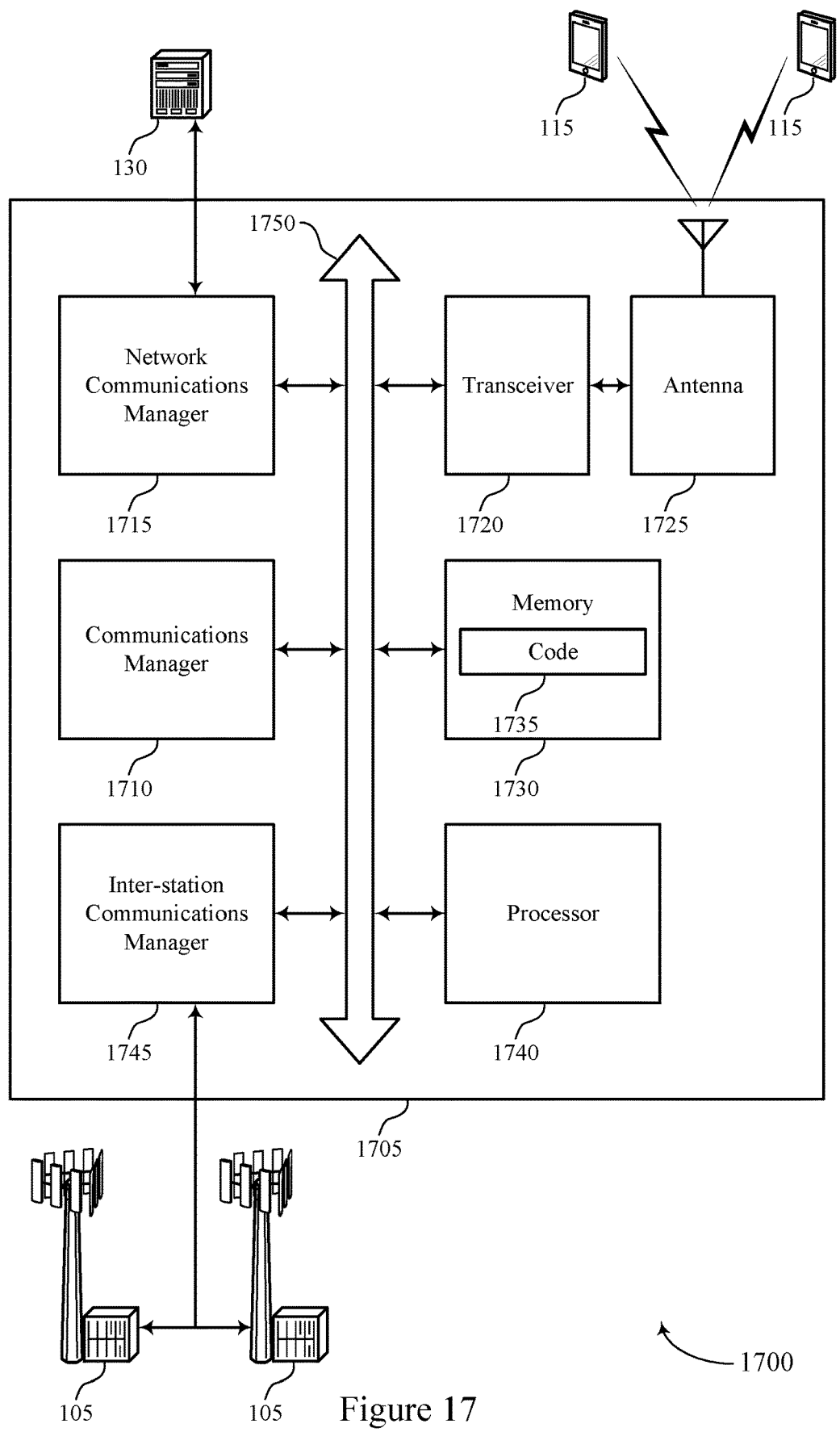
FIG. 17 shows a diagram of a system including a device that supports resource mapping and waveform generation for uplink transmission in accordance with aspects of the present disclosure.

FIG. 17 shows a diagram of a system 1700 including a device 1705 that supports resource mapping and waveform generation for uplink transmission in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (for example, bus 1750).

The communications manager 1710 may receive a random access channel uplink transmission that includes a preamble and a payload, determine that the random access channel uplink transmission is asynchronous based on receiving the random access channel uplink transmission, and perform channel estimation for the payload using the preamble based on the random access channel uplink transmission being asynchronous. The communications manager 1710 may also receive a random access channel uplink transmission that includes a preamble and a payload, determine that a signal is received during a guard time of the preamble based on receiving the random access channel uplink transmission, and perform channel estimation for the payload using the preamble based on determining that the signal is received during the guard time of the preamble.

The network communications manager 1715 may manage communications with the core network (for example, via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some examples, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (for example, the processor 1740) cause the device to perform various functions described herein. In some examples, the memory 1730 may contain, among other things, a BIOS which may control basic hardware or software operation such as the interaction with peripheral components or devices.

The processor 1740 may include an intelligent hardware device (for example, a general-purpose processor, a DSP, a CPU, a microcontroller, an ASIC, an FPGA, a PLD, a discrete gate or transistor logic component, a discrete hardware component, or any combination thereof). In some examples, the processor 1740 may be configured to operate a memory array using a memory controller. In some examples, a memory controller may be integrated into processor 1740. The processor 1740 may be configured to execute computer-readable instructions stored in a memory (for example, the memory 1730) to cause the device 1705 to perform various functions (for example, functions or tasks supporting resource mapping and waveform generation for uplink transmission).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some examples, the code 1735 may not be directly executable by the processor 1740 but may cause a computer (for example, when compiled and executed) to perform functions described herein.

Figure 18:
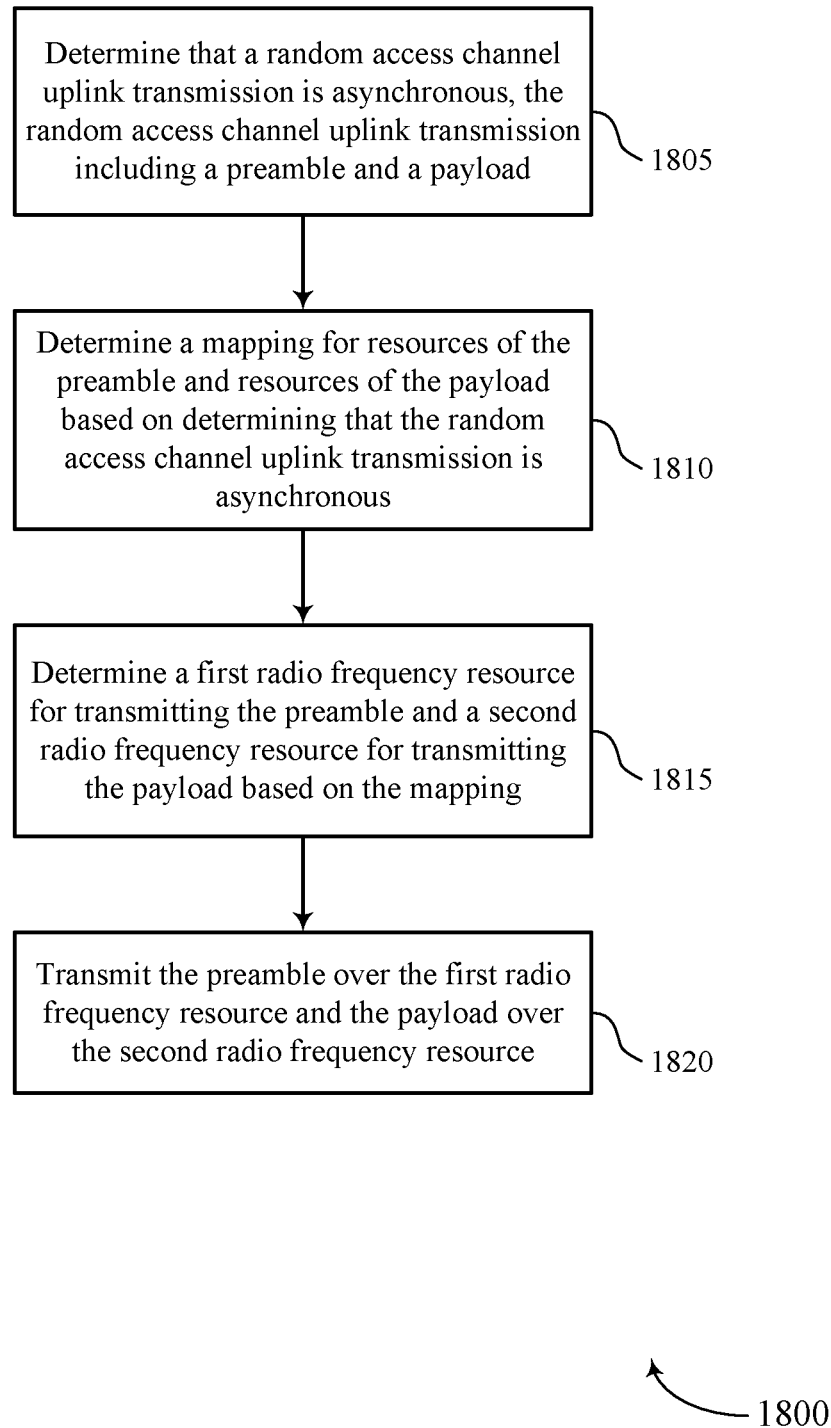
FIGS. 18 through 21 show flowcharts illustrating methods that support resource mapping and waveform generation for uplink transmission in accordance with aspects of the present disclosure.

FIG. 18 shows a flowchart illustrating a method 1800 that supports resource mapping and waveform generation for uplink transmission in accordance with aspects of the present disclosure. The operations of method 1800 may be implemented by a UE 115 or its components as described herein. For example, the operations of method 1800 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1805, the UE may determine that a random access channel uplink transmission is asynchronous, the random access channel uplink transmission including a preamble and a payload. The operations of 1805 may be performed according to the methods described herein. In some examples, aspects of the operations of 1805 may be performed by an uplink transmission manager as described with reference to FIGS. 10-13.

At 1810, the UE may determine a mapping for resources of the preamble and resources of the payload based on determining that the random access channel uplink transmission is asynchronous. The operations of 1810 may be performed according to the methods described herein. In some examples, aspects of the operations of 1810 may be performed by a mapping manager as described with reference to FIGS. 10-13.

At 1815, the UE may determine a first radio frequency resource for transmitting the preamble and a second radio frequency resource for transmitting the payload based on the mapping. The operations of 1815 may be performed according to the methods described herein. In some examples, aspects of the operations of 1815 may be performed by a resource manager as described with reference to FIGS. 10-13.

At 1820, the UE may transmit the preamble over the first radio frequency resource and the payload over the second radio frequency resource. The operations of 1820 may be performed according to the methods described herein. In some examples, aspects of the operations of 1820 may be performed by a transmission manager as described with reference to FIGS. 10-13.

Figure 19:
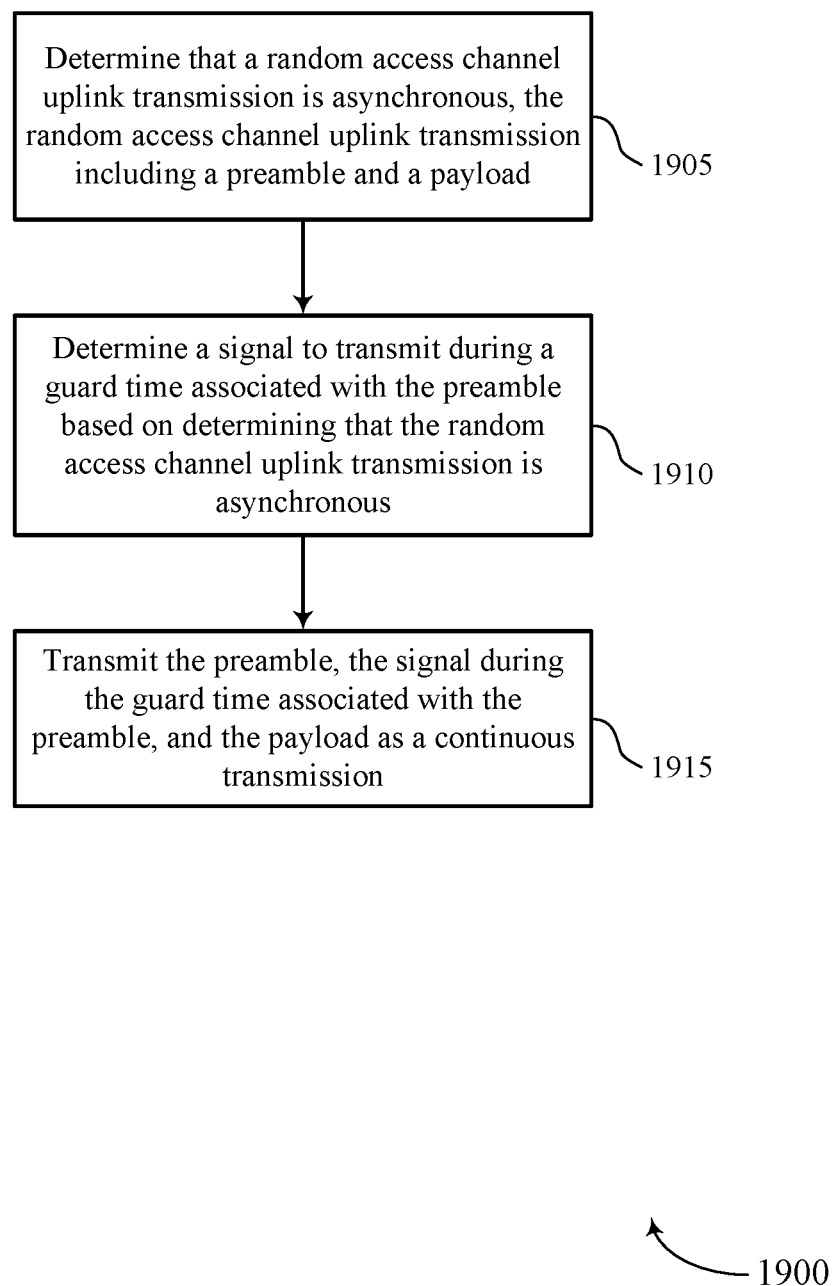

FIG. 19 shows a flowchart illustrating a method 1900 that supports resource mapping and waveform generation for uplink transmission in accordance with aspects of the present disclosure. The operations of method 1900 may be implemented by a UE 115 or its components as described herein. For example, the operations of method 1900 may be performed by a communications manager as described with reference to FIGS. 10-13. In some examples, a UE may execute a set of instructions to control the functional elements of the UE to perform the functions described below. Additionally or alternatively, a UE may perform aspects of the functions described below using special-purpose hardware.

At 1905, the UE may determine that a random access channel uplink transmission is asynchronous, the random access channel uplink transmission including a preamble and a payload. The operations of 1905 may be performed according to the methods described herein. In some examples, aspects of the operations of 1905 may be performed by an uplink transmission manager as described with reference to FIGS. 10-13.

At 1910, the UE may determine a signal to transmit during a guard time associated with the preamble based on determining that the random access channel uplink transmission is asynchronous. The operations of 1910 may be performed according to the methods described herein. In some examples, aspects of the operations of 1910 may be performed by a signal manager as described with reference to FIGS. 10-13.

At 1915, the UE may transmit the preamble, the signal during the guard time associated with the preamble, and the payload as a continuous transmission. The operations of 1915 may be performed according to the methods described herein. In some examples, aspects of the operations of 1915 may be performed by a transmission manager as described with reference to FIGS. 10-13.

Figure 20:
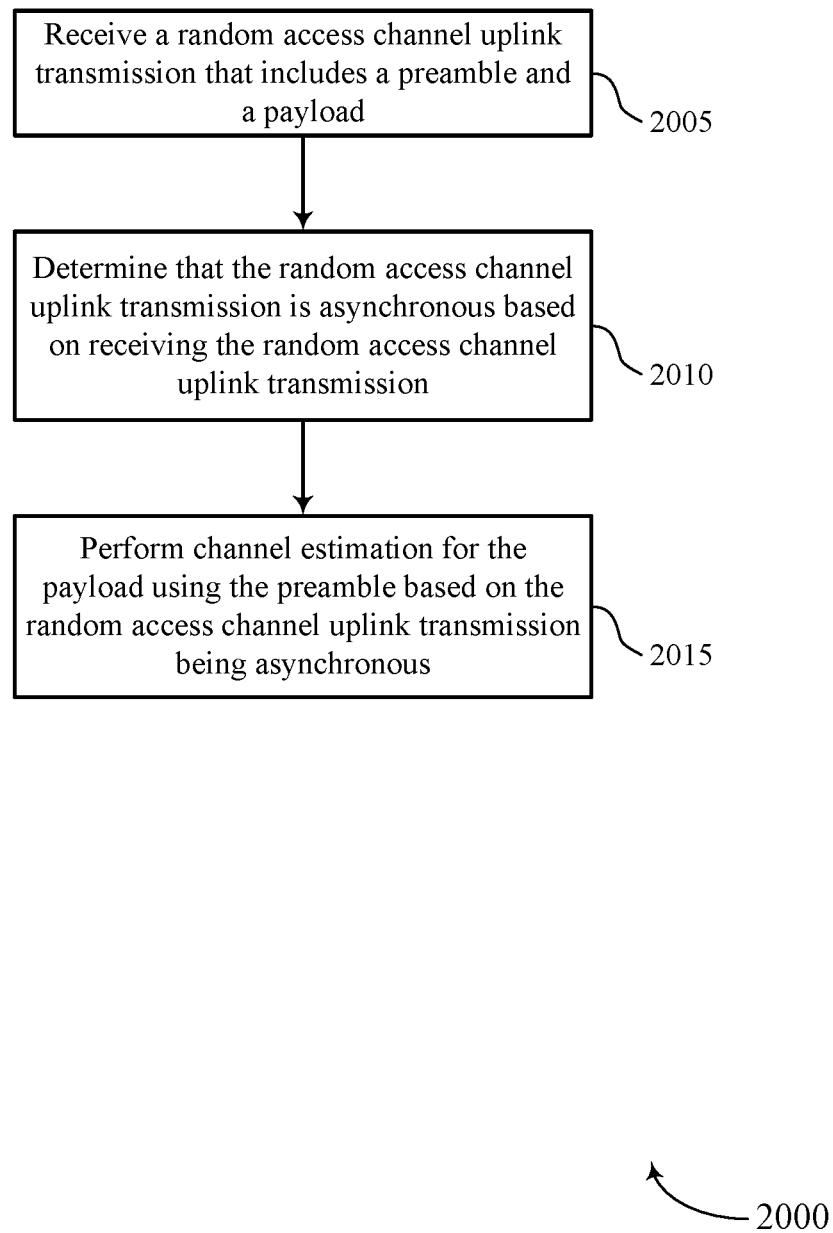

FIG. 20 shows a flowchart illustrating a method 2000 that supports resource mapping and waveform generation for uplink transmission in accordance with aspects of the present disclosure. The operations of method 2000 may be implemented by a base station 105 or its components as described herein. For example, the operations of method 2000 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2005, the base station may receive a random access channel uplink transmission that includes a preamble and a payload. The operations of 2005 may be performed according to the methods described herein. In some examples, aspects of the operations of 2005 may be performed by a receiving manager as described with reference to FIGS. 14-17.

At 2010, the base station may determine that the random access channel uplink transmission is asynchronous based on receiving the random access channel uplink transmission. The operations of 2010 may be performed according to the methods described herein. In some examples, aspects of the operations of 2010 may be performed by an uplink transmission manager as described with reference to FIGS. 14-17.

At 2015, the base station may perform channel estimation for the payload using the preamble based on the random access channel uplink transmission being asynchronous. The operations of 2015 may be performed according to the methods described herein. In some examples, aspects of the operations of 2015 may be performed by a channel estimation manager as described with reference to FIGS. 14-17.

Figure 21:
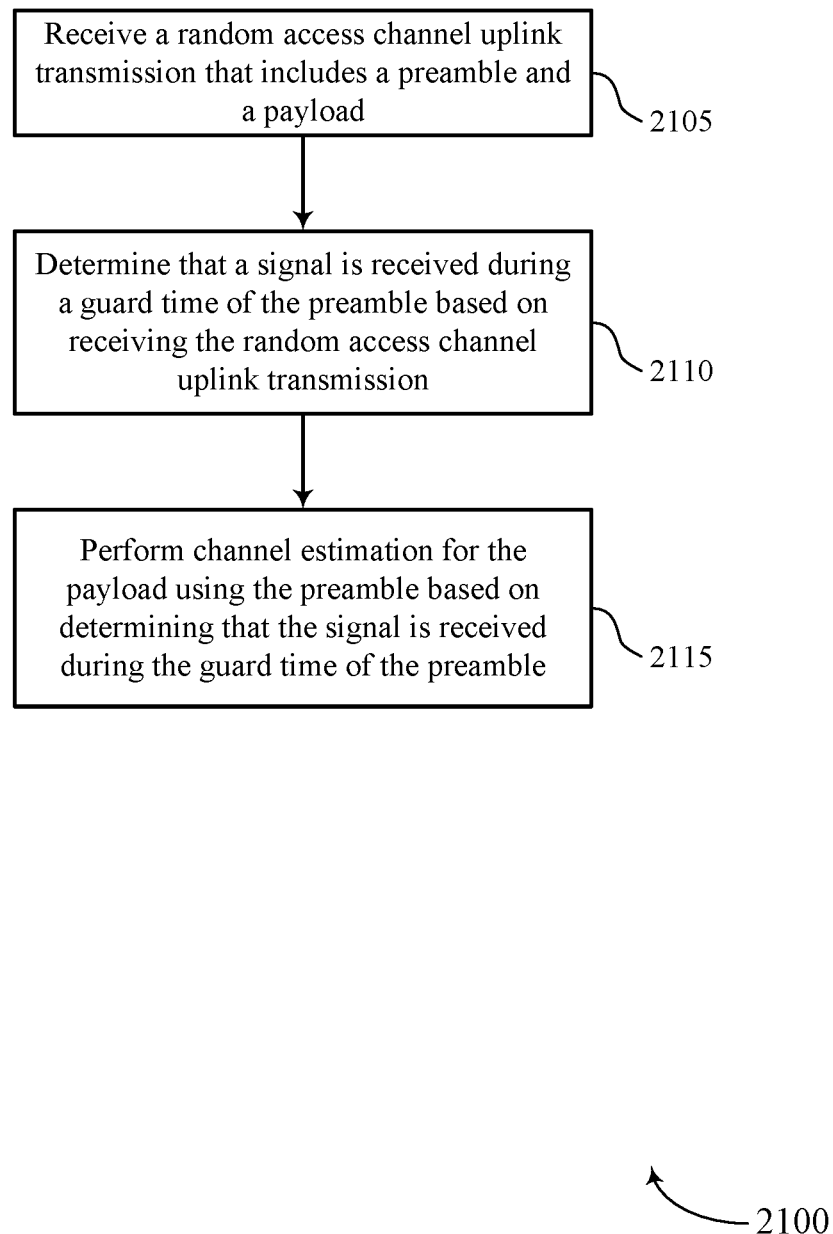

FIG. 21 shows a flowchart illustrating a method 2100 that supports resource mapping and waveform generation for uplink transmission in accordance with aspects of the present disclosure. The operations of method 2100 may be implemented by a base station 105 or its components as described herein. For example, the operations of method 2100 may be performed by a communications manager as described with reference to FIGS. 14-17. In some examples, a base station may execute a set of instructions to control the functional elements of the base station to perform the functions described below. Additionally or alternatively, a base station may perform aspects of the functions described below using special-purpose hardware.

At 2105, the base station may receive a random access channel uplink transmission that includes a preamble and a payload. The operations of 2105 may be performed according to the methods described herein. In some examples, aspects of the operations of 2105 may be performed by an uplink transmission manager as described with reference to FIGS. 14-17.

At 2110, the base station may determine that a signal is received during a guard time of the preamble based on receiving the random access channel uplink transmission. The operations of 2110 may be performed according to the methods described herein. In some examples, aspects of the operations of 2110 may be performed by a signal manager as described with reference to FIGS. 14-17.

At 2115, the base station may perform channel estimation for the payload using the preamble based on determining that the signal is received during the guard time of the preamble. The operations of 2115 may be performed according to the methods described herein. In some examples, aspects of the operations of 2115 may be performed by a channel estimation manager as described with reference to FIGS. 14-17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA). CDMA2000 covers IS-2000, IS-95, and IS-856 standards. IS-2000 Releases may be commonly referred to as CDMA2000 1x, 1x. IS-856 (TIA-856) is commonly referred to as CDMA2000 1xEV-DO, High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (for example, two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other PLD, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (that is, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment, comprising:
   receiving, from a base station, system information indicating a mapping between time-frequency resources and random access channel transmissions;
   transmitting an asynchronous random access channel over a first time-frequency resource based at least in part on receiving the system information, wherein the asynchronous random access channel is asynchronous based at least in part on the user equipment not storing uplink timing information associated with the asynchronous random access channel, and wherein the first time-frequency resource is based at least in part on the mapping; and
   transmitting a synchronous random access channel over a second time-frequency resource that at least partially overlaps with the first time-frequency resource, wherein a payload portion of the synchronous random access channel is associated with a shared preamble of the asynchronous random access channel.

2. The method of claim 1, wherein the second time-frequency resource is the same as the first time-frequency resource or occupies a portion of the first time-frequency resource.

3. The method of claim 1, wherein the payload portion of the synchronous random access channel is further associated with a preamble of the synchronous random access channel.

4. The method of claim 1, further comprising:
determining that a timer is running at the user equipment, the timer associated with the synchronous random access channel; and
determining that the synchronous random access channel is synchronous based at least in part on determining that the timer is running at the user equipment.

5. The method of claim 1, wherein the asynchronous random access channel comprises a payload portion.

6. The method of claim 1, further comprising:
determining that the user equipment is in a radio resource control idle state or a radio resource control inactive state; and
determining that the asynchronous random access channel is asynchronous based at least in part on determining that the user equipment is in the radio resource control idle state or the radio resource control inactive state.

7. The method of claim 1, further comprising:
determining that a time alignment timer associated with the asynchronous random access channel has expired; and
determining that the asynchronous random access channel is asynchronous based at least in part on determining that the time alignment timer has expired.

8. The method of claim 1, wherein the shared preamble of the asynchronous random access channel is configured to be processed by the base station for channel estimation associated with a payload of the asynchronous random access channel.

9. The method of claim 1, wherein the asynchronous random access channel comprises a two-step random access channel uplink transmission.

10. The method of claim 1, wherein a payload of the asynchronous random access channel comprises one or more of a demodulation reference signal, a physical uplink shared channel, or a guard time.

11. The method of claim 1, wherein a mapping associated with the asynchronous random access channel is different than a mapping associated with synchronous uplink transmissions.

12. The method of claim 1, wherein the system information indicates one or both of a waveform generation for the asynchronous random access channel or a waveform generation for the synchronous random access channel.

13. An apparatus for wireless communications at a user equipment, comprising:
a processor,
memory in electronic communication with the processor; and
instructions stored in the memory and executable by the processor to cause the apparatus to:
receive, from a base station, system information indicating a mapping between time-frequency resources and random access channel transmissions;
transmit an asynchronous random access channel over a first time-frequency resource based at least in part on receiving the system information, wherein the asynchronous random access channel is asynchronous based at least in part on the user equipment not storing uplink timing information associated with the asynchronous random access channel, and wherein the first time-frequency resource is based at least in part on the mapping; and
transmit a synchronous random access channel over a second time-frequency resource that at least partially overlaps with the first time-frequency resource, wherein a payload portion of the synchronous random access channel is associated with a shared preamble of the asynchronous random access channel.

14. The apparatus of claim 13, wherein the second time-frequency resource is the same as the first time-frequency resource or occupies a portion of the first time-frequency resource.

15. The apparatus of claim 13, wherein the payload portion of the synchronous random access channel is further associated with a preamble of the synchronous random access channel.

16. The apparatus of claim 13, wherein the instructions are further executable by the processor to cause the apparatus to:
determine that a timer is running at the user equipment, the timer associated with the synchronous random access channel; and
determine that the synchronous random access channel is synchronous based at least in part on determining that the timer is running at the user equipment.

17. The apparatus of claim 13, wherein the asynchronous random access channel comprises a payload portion.

18. The apparatus of claim 13, wherein the instructions are further executable by the processor to cause the apparatus to:
determine that the user equipment is in a radio resource control idle state or a radio resource control inactive state; and
determine that the asynchronous random access channel is asynchronous based at least in part on determining that the user equipment is in the radio resource control idle state or the radio resource control inactive state.

19. The apparatus of claim 13, wherein the instructions are further executable by the processor to cause the apparatus to:
determine that a time alignment timer associated with the asynchronous random access channel has expired; and
determine that the asynchronous random access channel is asynchronous based at least in part on determining that the time alignment timer has expired.

20. The apparatus of claim 13, wherein the shared preamble of the asynchronous random access channel is configured to be processed by a base station for channel estimation associated with a payload of the asynchronous random access channel.

21. The apparatus of claim 13, wherein the asynchronous random access channel comprises a two-step random access channel uplink transmission.

22. The apparatus of claim 13, wherein a payload of the asynchronous random access channel comprises one or more of a demodulation reference signal, a physical uplink shared channel, or a guard time.

23. The apparatus of claim 13, wherein a mapping associated with the asynchronous random access channel is different than a mapping associated with synchronous uplink transmissions.

24. The apparatus of claim 13, wherein the system information indicates one or both of a waveform generation for the asynchronous random access channel or a waveform generation for the synchronous random access channel.

* * * * *